US011696173B2

(12) United States Patent
Lee et al.

(10) Patent No.: US 11,696,173 B2
(45) Date of Patent: Jul. 4, 2023

(54) WAKE-UP SIGNAL ERROR HANDLING

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Liangchi Hsu, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/180,493

(22) Filed: Feb. 19, 2021

(65) Prior Publication Data

US 2022/0272568 A1    Aug. 25, 2022

(51) Int. Cl.
*H04W 28/04* (2009.01)
*H04W 76/19* (2018.01)
(Continued)

(52) U.S. Cl.
CPC ....... *H04W 28/04* (2013.01); *H04W 52/0216* (2013.01); *H04W 52/0229* (2013.01);
(Continued)

(58) Field of Classification Search
CPC ............. H04W 28/04; H04W 52/0216; H04W 52/0229; H04W 76/19; H04W 76/28
See application file for complete search history.

(56) References Cited

U.S. PATENT DOCUMENTS

2020/0145921 A1    5/2020  Zhang et al.
2020/0351777 A1*  11/2020  Kim ................. H04W 52/0245
(Continued)

OTHER PUBLICATIONS

CATT: "NR-UE-Pow-Sav-WUS-01", 3GPP TSG RAN WG1 Meeting #100 bis-e, 3GPP Draft, R1-2003067, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 1, 2020, May 1, 2020 (May 1, 2020), 51 Pages, XP051879611, Retrieved from the Internet: URL: https://ftp.3gpp.org/tsg_ran/WG1_RL1/TSGR1_100b_e/Docs/R1-2003067.zip, R1-2003067 Summary of AI-7.2.7.1 WUS.docx [retrieved on May 1, 2020] Proposal 2.
(Continued)

*Primary Examiner* — Min Jung
(74) *Attorney, Agent, or Firm* — Holland & Hart LLP

(57) ABSTRACT

Methods, systems, and devices for wireless communications are described. Techniques are described to enable wake-up signal (WUS) error handling at a user equipment (UE). The UE may detect an error pattern when attempting to receive a WUS from a base station based on a configuration for receiving the WUS. For example, the base station may transmit the configuration for receiving the WUS to a set of UEs including the UE. Based on detecting the error pattern, the UE may perform a mitigation operation based on determining the error pattern, such as waking up multiple cells to receive a transmission indicated by the WUS, transmitting a radio link failure indication to the base station, etc. Additionally or alternatively, the base station may transmit multiple WUSs to the UEs, such as a first WUS according to the configuration and a second WUS according to a reconfiguration.

24 Claims, 18 Drawing Sheets

(51) Int. Cl.
  *H04W 76/28* (2018.01)
  *H04W 52/02* (2009.01)
  *H04W 76/30* (2018.01)
  *H04W 76/11* (2018.01)
  *H04L 1/00* (2006.01)

(52) U.S. Cl.
  CPC ........... *H04W 76/19* (2018.02); *H04W 76/28* (2018.02); *H04L 1/0061* (2013.01); *H04W 76/11* (2018.02); *H04W 76/30* (2018.02)

(56) References Cited

U.S. PATENT DOCUMENTS

2020/0367166 A1\* 11/2020 Wong ................. H04W 52/0229
2022/0116876 A1\* 4/2022 Sun ........................ H04L 5/0053

OTHER PUBLICATIONS

CATT: "Summary of PDCCH-Based Power Saving Signal/Channel", 3GPP TSG RAN WG1 Meeting #100 bis-e 3GPP Draft, R1-2002698, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 1, 2020, Apr. 15, 2020 (Apr. 15, 2020), 19 Pages, XP051876449, Retrieved from the Internet: URL: https://ftp.3gpp.org/tsg_ran/WG1_RL1/TSGR1_100b_e/Docs/R1-2002698.zip, R1-2002698_Summary of AI-7.2.7.1 Power saving signal.docx [retrieved on Apr. 15, 2020],The whole document.
Ericsson: "Remaining Issues of PDCCH-WUS", 3GPP TSG RAN WG1 Meeting #100 bis-e, 3GPP Draft, R1-2002414, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), 10 Pages, XP051875610, Retrieved from the Internet: URL: https://ftp.3gpp.org/tsg_ran/WG1_RL1/TSGR1_100b_e/Docs/R1-2002414.zip, R1-2002414 Remaining issues for WUS.docx [retrieved on Apr. 11, 2020 ],The whole document.
Partial International Search Report—PCT/US2022/012927—ISA/EPO—dated Apr. 22, 2022.
International Search Report and Written Opinion—PCT/US2022/012927—ISA/EPO—dated Jul. 6, 2022.

\* cited by examiner

WAKE-UP SIGNAL ERROR HANDLING

FIELD OF TECHNOLOGY

The following relates to wireless communications, including wake-up signal (WUS) error handling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some wireless communications systems, a UE may enter a discontinuous reception (DRX) mode to conserve power usage at the UE.

SUMMARY

The described techniques relate to improved methods, systems, devices, and apparatuses that support wake-up signal (WUS) error handling. Generally, the described techniques provide for a user equipment (UE) to receive a configuration for receiving a WUS from a base station. The base station may transmit the configuration for receiving the WUS to a set of UEs (e.g., one or more UEs) including the UE, where the configuration includes a size of the WUS and respective starting bit positions of the WUS for each UE of the set of UEs to read. Subsequently, the UE may monitor for and receive a WUS from the base station according to the configuration (e.g., based on a starting position for the UE indicated in the configuration or other factors). However, in some examples, the UE may determine that an error pattern occurs when attempting to receive the WUS. Accordingly, the UE may then perform one or more mitigation operations based on determining the error pattern. For example, the UE may wake up multiple cells (e.g., a primary cell (PCell), a primary secondary cell (PSCell), one or more secondary cells (SCells), etc.) to receive a transmission indicated by the WUS based on determining the error pattern. Additionally or alternatively, the UE may transmit a radio link failure (RLF) indication to the base station to release a connection with the base station if a number of error patterns occur consecutively when trying to receive the WUS and may attempt to reconnect to the base station (e.g., to rectify the error patterns).

In some examples, the base station may identify that at least one UE of the set of UEs is no longer connected to the base station. Accordingly, based on this at least one UE no longer being connected to the base station, the configuration for the WUS may no longer be valid. The base station may then determine a reconfiguration for other UEs, such as the remaining UEs, to receive the WUS (e.g., with an updated size of the WUS and updated respective starting bit positions that may be based on configuration information for the at least one UE being removed) and may transmit the reconfiguration to the other UEs, such as the remaining UEs. However, one or more of the remaining UEs may not receive the reconfiguration before receiving a next WUS. As such, the base station may transmit multiple WUSs to one or more of the remaining UEs, such as a first WUS according to the initial configuration and a second WUS according to the reconfiguration. In some examples, the base station may differentiate the multiple WUSs based on scrambling one or more cyclic redundancy checks (CRCs) of one or more WUSs with a radio network temporary identifier (RNTI) included in each configuration or reconfiguration for a corresponding WUS.

A method for wireless communications at a UE is described. The method may include receiving, from a base station, a configuration for receiving a WUS transmission for a set of multiple UEs including the UE, the configuration including a size of the WUS transmission and a first starting bit position of the WUS transmission for the UE to read; receiving, from the base station based on the configuration for the WUS transmission, a WUS indicating for the UE to wake up one or more cells to receive a transmission from the base station based on a configured offset between receiving the WUS and receiving the transmission; determining that at least one error pattern of a set of multiple error patterns occurs for the received WUS; and performing a mitigation operation based on determining the at least one error pattern.

An apparatus for wireless communications at a UE is described. The apparatus may include a processor, memory coupled with the processor, and instructions stored in the memory. The instructions may be executable by the processor to cause the apparatus to receive, from a base station, a configuration for receiving a WUS transmission for a set of multiple UEs including the UE, the configuration including a size of the WUS transmission and a first starting bit position of the WUS transmission for the UE to read; to receive, from the base station based on the configuration for the WUS transmission, a WUS indicating for the UE to wake up one or more cells to receive a transmission from the base station based on a configured offset between receiving the WUS and receiving the transmission; to determine that at least one error pattern of a set of multiple error patterns occurs for the received WUS; and to perform a mitigation operation based on determining the at least one error pattern.

Another apparatus for wireless communications at a UE is described. The apparatus may include means for receiving, from a base station, a configuration for receiving a WUS transmission for a set of multiple UEs including the UE, the configuration including a size of the WUS transmission and a first starting bit position of the WUS transmission for the UE to read; means for receiving, from the base station based on the configuration for the WUS transmission, a WUS indicating for the UE to wake up one or more cells to receive a transmission from the base station based on a configured offset between receiving the WUS and receiving the transmission; means for determining that at least one error pattern of a set of multiple error patterns occurs for the received WUS; and means for performing a mitigation operation based on determining the at least one error pattern.

A non-transitory computer-readable medium storing code for wireless communications at a UE is described. The code may include instructions executable by a processor to receive, from a base station, a configuration for receiving a WUS transmission for a set of multiple UEs including the UE, the configuration including a size of the WUS transmission and a first starting bit position of the WUS transmission for the UE to read; to receive, from the base station based on the configuration for the WUS transmission, a WUS indicating for the UE to wake up one or more cells to receive a transmission from the base station based on a configured offset between receiving the WUS and receiving the transmission; to determine that at least one error pattern of a set of multiple error patterns occurs for the received WUS; and to perform a mitigation operation based on determining the at least one error pattern.

In some examples of the method, apparatuses, and non-transitory computer-readable medium described herein, performing the mitigation operation may include operations, features, means, or instructions for waking up a set of multiple cells to receive the transmission indicated by the WUS based on determining the at least one error pattern.

In some examples of the method, apparatuses, and non-transitory computer-readable medium described herein, the set of multiple cells includes a PCell of a master cell group (MCG), one or more SCells of the MCG, a PSCell of a secondary cell group (SCG), one or more SCells of the SCG, or any combination thereof.

In some examples of the method, apparatuses, and non-transitory computer-readable medium described herein, performing the mitigation operation may include operations, features, means, or instructions for transmitting, to the base station, an RLF indication to release a connection with the base station based on determining the at least one error pattern and attempting to reestablish a connection with the base station based on transmitting the RLF indication.

Some examples of the method, apparatuses, and non-transitory computer-readable medium described herein may further include operations, features, means, or instructions for determining to transmit the RLF indication based on determining that a number of error patterns for receiving the WUS transmission according to the configuration occur, where the number of error patterns satisfies a threshold value.

Some examples of the method, apparatuses, and non-transitory computer-readable medium described herein may further include operations, features, means, or instructions for receiving, from the base station, a reconfiguration message for the WUS transmission, the reconfiguration message including a second size of the WUS transmission different than the size of the WUS transmission, including a second starting bit position for the UE to read of the WUS transmission different than the first starting bit position, or both and receiving, from the base station, a second WUS based on the reconfiguration message.

Some examples of the method, apparatuses, and non-transitory computer-readable medium described herein may further include operations, features, means, or instructions for transmitting, to the base station, a reconfiguration complete message indicating successful reception of the reconfiguration message, where the second WUS may be received based on transmitting the reconfiguration complete message.

In some examples of the method, apparatuses, and non-transitory computer-readable medium described herein, the configuration for the WUS transmission further includes an indication of a first power saving (PS) RNTI with which a CRC of the WUS may be scrambled and the method, apparatuses, and non-transitory computer-readable medium may include further operations, features, means, or instructions for receiving the WUS based on the CRC of the WUS being scrambled with the first PS-RNTI and receiving, from the base station, a second WUS with a CRC scrambled with a second PS-RNTI, the second WUS indicating for the UE to wake up one or more additional cells to receive the transmission from the base station.

Some examples of the method, apparatuses, and non-transitory computer-readable medium described herein may further include operations, features, means, or instructions for waking up the one or more cells indicated by the WUS based on the configuration for the WUS transmission including the indication of the first PS-RNTI.

Some examples of the method, apparatuses, and non-transitory computer-readable medium described herein may further include operations, features, means, or instructions for receiving, from the base station, a reconfiguration message for the WUS transmission, the reconfiguration message including an indication of the second PS-RNTI and waking up the one or more additional cells indicated by the second WUS based on receiving the reconfiguration message including the indication of the second PS-RNTI.

In some examples of the method, apparatuses, and non-transitory computer-readable medium described herein, determining the error pattern of the set of multiple error patterns may include operations, features, means, or instructions for determining that a size of the WUS may be different than the size of the WUS transmission indicated in the configuration, that the size of the WUS may be smaller than or equal to the starting bit position for the UE to read of the WUS transmission indicated in the configuration, that a number of bits for an SCell dormancy indication in the WUS may be different than a number of dormancy groups for the UE, that the WUS indicates for the UE to not wake up a PCell and for the UE to wake up one or more SCells, or any combination thereof.

A method for wireless communications at a base station is described. The method may include transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read; determining that at least one UE of the set of multiple UEs is no longer connected to the base station and that a subset of the set of multiple UEs different than the at least one UE are connected to the base station; transmitting, to the subset of the set of multiple UEs, a reconfiguration message for receiving the WUS transmission based on determining that the at least one UE is no longer connected to the base station; and transmitting, to the subset of the set of multiple UEs, a WUS based on the reconfiguration message.

An apparatus for wireless communications at a base station is described. The apparatus may include a processor, memory coupled with the processor, and instructions stored in the memory. The instructions may be executable by the processor to cause the apparatus to transmit, to a set of multiple UEs, a configuration for receiving a WUS transmission for the set of multiple UEs, the configuration including a size of the WUS transmission and respective starting bit positions of the WUS transmission for each UE of the set of multiple UEs to read; to determine that at least one UE of the set of multiple UEs is no longer connected to the base station and that a subset of the set of multiple UEs different than the at least one UE are connected to the base station; to transmit, to the subset of the set of multiple UEs, a reconfiguration message for receiving the WUS transmission based on determining that the at least one UE is no longer connected to the base station; and to transmit, to the subset of the set of multiple UEs, a WUS based on the reconfiguration message.

Another apparatus for wireless communications at a base station is described. The apparatus may include means for transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read; means for determining that at least one UE of the set of multiple UEs is no longer connected to the base station and that a subset of the set of multiple UEs different than the at least one UE are connected to the base station; means for transmitting, to the subset of the set of multiple UEs, a reconfiguration message for receiving the WUS transmission based on determining that the at least one UE is no longer connected to the base station; and means for transmitting, to the subset of the set of multiple UEs, a WUS based on the reconfiguration message.

A non-transitory computer-readable medium storing code for wireless communications at a base station is described. The code may include instructions executable by a processor to transmit, to a set of multiple UEs, a configuration for receiving a WUS transmission for the set of multiple UEs, the configuration including a size of the WUS transmission and respective starting bit positions of the WUS transmission for each UE of the set of multiple UEs to read; to determine that at least one UE of the set of multiple UEs is no longer connected to the base station and that a subset of the set of multiple UEs different than the at least one UE are connected to the base station; to transmit, to the subset of the set of multiple UEs, a reconfiguration message for receiving the WUS transmission based on determining that the at least one UE is no longer connected to the base station; and to transmit, to the subset of the set of multiple UEs, a WUS based on the reconfiguration message.

Some examples of the method, apparatuses, and non-transitory computer-readable medium described herein may further include operations, features, means, or instructions for receiving, from a UE of the subset of the set of multiple UEs, an RLF indication to release a connection with the UE based on a number of error patterns occurring for the UE when receiving the WUS and attempting to reestablish the connection with the UE based on receiving the RLF indication.

In some examples of the method, apparatuses, and non-transitory computer-readable medium described herein, the RLF indication may be received based on the number of error patterns satisfying a threshold value.

Some examples of the method, apparatuses, and non-transitory computer-readable medium described herein may further include operations, features, means, or instructions for receiving, from each UE of the subset of the set of multiple UEs, a reconfiguration complete message indicating successful reception of the reconfiguration message, where the WUS may be transmitted according to the reconfiguration message based on receiving the reconfiguration complete message from each UE of the subset of the set of multiple UEs.

Some examples of the method, apparatuses, and non-transitory computer-readable medium described herein may further include operations, features, means, or instructions for transmitting, to the subset of the set of multiple UEs, a first WUS according to the configuration for the WUS transmission, where a first CRC of the first WUS may be scrambled with a first PS-RNTI included in the configuration for the WUS transmission and transmitting, to the subset of the set of multiple UEs, a second WUS according to a reconfiguration in the reconfiguration message for the WUS transmission, where a second CRC may be scrambled with a second PS-RNTI included in the reconfiguration message for the WUS transmission.

Some examples of the method, apparatuses, and non-transitory computer-readable medium described herein may further include operations, features, means, or instructions for receiving, from each UE of the subset of the set of multiple UEs, a reconfiguration complete message indicating successful reception of the reconfiguration message and refraining from transmitting a subsequent WUS according to the configuration for the WUS transmission based on receiving the reconfiguration complete message from each UE of the subset of the set of multiple UEs.

DETAILED DESCRIPTION

Figure 1:
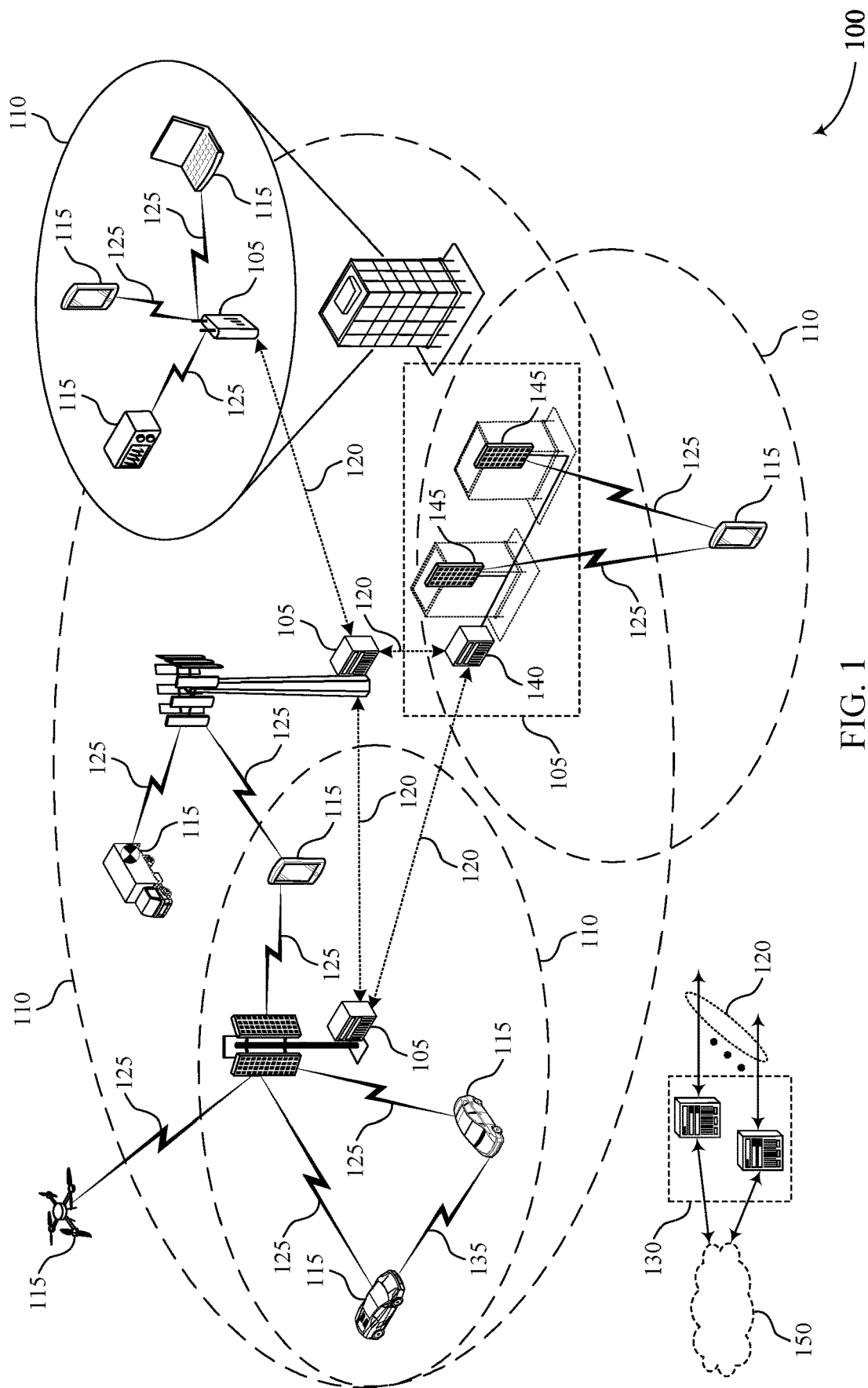
FIG. 1 illustrates an example of a wireless communications system that supports wake-up signal (WUS) error handling in accordance with aspects of the present disclosure.

In some wireless communications systems, a UE may enter a discontinuous reception (DRX) mode to, for example, conserve power usage at the UE. When a UE operates in a DRX mode, the UE may transition between different states, such as an active state and an inactive state in a DRX cycle. When the UE is in an active DRX duration (e.g., active state), the UE may be configured to transmit and receive information, and when the UE is in an inactive DRX duration (e.g., inactive state) the UE may refrain from monitoring for signals from another device, such as a base station, and may also refrain from transmitting or receiving some types of information. Before transitioning to the active state during an active DRX duration, the UE may receive the WUS from the base station indicating whether the UE is to wake up and which cells of the UE to wake up for the subsequent active DRX duration. However, one or more errors may occur when the UE receives the WUS. Accordingly, techniques are desired for mitigating such errors for the UE in receiving a WUS.

In some wireless communications systems, a base station may transmit a wake-up signal (WUS) (e.g., as part of operating in a discontinuous reception (DRX) mode) to one or more UEs (e.g., multiple UEs) to indicate which UE is to wake up for a subsequent awake period to communicate with the base station. For example, the WUS may include multiple blocks, where each block of the multiple blocks may be configured for a corresponding UE of the multiple UEs. Additionally, each block may include multiple bits to indicate which cells that the corresponding UE is to wake up for (e.g., a primary cell (PCell), a primary secondary cell (PSCell), one or more secondary cells (SCells) configured into one or more SCell dormancy groups, etc.) in communicating with the base station during the subsequent awake period. Accordingly, the base station may indicate a configuration of the WUS to at least some of, if not each of, the multiple UEs and the configuration may include a starting bit location of the WUS to indicate where each UE looks for wake up indication(s) (e.g., a start of a corresponding block of the WUS for a given UE) and may indicate a total size of the WUS.

However, if at least one of the UEs has a connection to the base station released or transferred to a different base station (e.g., or a different cell of the same base station), the configuration of the WUS may change such that one or more of the remaining UEs connected to the base station may experience issues when attempting to receive corresponding wake up indications in the WUS (e.g., based on block(s) corresponding to the at least one UE whose connection is released/transferred being removed from the WUS). Additionally or alternatively, when the base station determines that the at least one UE has the connection to the base station released or transferred, the base station may transmit a reconfiguration message to reconfigure how some other UEs, such as the remaining UEs, should read the WUS (e.g., different total size, different starting bit positions for each UE). Some of the UEs, however, may not receive the reconfiguration message before an awake period (e.g., a period during which the UEs are configured to wake up and detect signaling), resulting in the UEs using an older configuration that is no longer valid to try and receive corresponding later wake up indications in the WUS.

As described herein, when receiving a WUS that is, for example, intended for multiple UEs, a UE may detect an error pattern (e.g., an indication of an error or adverse condition) in the received WUS based on a configuration for the WUS, and the UE may perform one or more mitigation operations based on the detected error pattern. For example, when the UE detects an error pattern, the UE may wake up, for example, its PCell and all SCells in a master cell group (MCG) (or a PSCell and all SCells in a secondary cell group (SCG)) as a mitigation operation. Additionally or alternatively, if the UE detects continuous error patterns in the WUS (e.g., the UE determines a number of error patterns that exceeds a threshold value), the UE may enter a radio link failure (RLF) procedure to re-establish a radio link with the base station or may release its connection with the base station.

In some examples, the detected error pattern may include a size of the WUS being smaller (or larger) than a configured size of the WUS, the size of the WUS being smaller than (or equal to) a configured starting bit position in the WUS for the UE to monitor for corresponding wake up indications, a number of bits in the WUS for which SCells of the UE to wake up being less than a number of SCell dormancy groups for the UE, a wake up indication for the PCell or PSCell being '0' (e.g., the UE is to refrain from waking up the PCell or PSCell) but at least one SCell is indicated to wake up, or a combination thereof. Subsequently, upon detecting one of these error patterns, the UE may turn on all cells for a subsequent awake period, may declare RLF, may release its connection, or may perform an additional mitigation operation, or any combination thereof. Additionally or alternatively, the base station may transmit multiple WUSs with different configurations (e.g., indicated by corresponding different radio network temporary identifiers (RNTIs)) to enable each of the remaining UEs to receive their corresponding wake up indications regardless of whether a previous configuration is used or a reconfiguration is used.

Aspects of the disclosure are initially described in the context of wireless communications systems. Additionally, aspects of the disclosure are illustrated through an additional wireless communications system, a flowchart, and a process flow. Aspects of the disclosure are further illustrated by and described with reference to apparatus diagrams, system diagrams, and flowcharts that relate to WUS error handling.

FIG. 1 illustrates an example of a wireless communications system 100 that supports WUS error handling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 may enter a DRX mode to, for example, conserve power usage at the UE 115. When a UE 115 operates in a DRX mode, the UE 115 may transition between an active state and an inactive state in a DRX cycle. When the UE 115 is in an active DRX duration (e.g., active state), the UE 115 may be configured to transmit and receive information, and when the UE 115 is in an inactive DRX duration (e.g., inactive state), the UE 115 may refrain from monitoring for signals from the base station and may also refrain from transmitting or receiving some types of information. In some examples, a base station 105 may also enter a DRX mode to conserve power usage at the base station 105.

Additionally, the UE 115 may use a connected DRX (CDRX) mode as part of the DRX mode. In some cases, CDRX may be defined per MAC-entity across CCs of a CA configuration. For example, CDRX may be defined for a first MAC-entity that includes a master cell group (MCG) (e.g., a PCell and one or more SCells) and for a second MAC entity that includes a secondary cell group (SCG) (e.g., a PSCell and one or more SCells). As such, the CDRX may include different DRX configurations per MAC-entity of the UE 115. For example, the different DRX configurations may include specific DRX cycles, on duration timers (e.g., drx-onDurationTimer), inactivity timers (e.g., drx-InactivityTimer), etc., that are defined as subcarrier spacing (SCS)-independent values (e.g., in 'ms'). Additionally or alternatively, the UE 115 may use the CDRX mode with dual connectivity configurations.

In some cases, before the start of an on duration (e.g., onDuration) for a corresponding MAC-entity (e.g., MCG or SCG) of a DRX or CDRX mode, a base station 105 (e.g., or another network device) may transmit a WUS to signal if UE(s) shall wake up in the next on duration (e.g., to receive communications from the base station 105, to transmit communications to the base station 105, etc.). For example, the base station 105 may transmit the WUS in a physical downlink control channel (PDCCH) using a corresponding downlink control information (DCI) format for the WUS (e.g., DCI Format 2_6) with a CRC scrambled by a power saving RNTI (PS-RNTI or PS_RNTI). If a wake-up indication in the WUS is toggled (e.g., Wake-up indication bit=1), the UE 115 may monitor a next on duration (e.g., to receive communications from the base station 105 during the on duration). Additionally or alternatively, if the wake-up indication in the WUS is not toggled (e.g., Wake-up indication bit=0), the UE 115 may skip monitoring a next on duration (e.g., and stay in an inactive state). The base station 105 may transmit the WUS a configured amount of time before the next on duration, where the UEs 115 receive an indication of this configured amount of time. For example, the configured amount of time may be referred to as an offset (e.g., a power saving offset (ps-Offset) and may be in terms of slots, subframes, absolute time (e.g., in milliseconds), or another time unit.

In some examples, if a UE 115 cannot detect the WUS (e.g., an error occurs), the UE 115 may follow a power saving wake-up procedure indicated by an information element (IE) received from a base station 105 via higher layer signaling (e.g., a ps_WakeUp IE in an RRC configuration from the base station 105). For example, if the IE is set to "TRUE" (e.g., ps_WakeUp=TRUE), then the UE 115 may still monitor a next on duration (e.g., even if the WUS is not detected). Additionally or alternatively, if the IE is not set to "TRUE" or the base station 105 does not transmit the higher layer signaling to the UE 115, if the WUS is not detected, the UE 115 may skip monitoring a next on duration. If the UE 115 is configured for dual connectivity (e.g., E-UTRA-NR dual connectivity (ENDC), NR-NR dual connectivity (NRDC), etc.), the base station 105 may transmit the WUS in different cells for different cell groups. For example, for an MCG, the base station 105 may transmit the WUS in a PCell (e.g., NR PCell). Additionally or alternatively, for an SCG, the base station 105 may transmit the WUS in a PSCell (e.g., NR PSCell).

Additionally, a base station 105 may transmit a WUS to one UE 115 or a group of UEs 115 (e.g., a set of one or more UEs 115). When the WUS is transmitted to the group of UEs 115, the base station 105 may configure multiple blocks in the WUS, where each UE 115 of the group of UEs 115 may receive or may be configured with a subset (e.g., one) of the blocks of the WUS. Accordingly, to enable each UE 115 to receive and read a corresponding block of the WUS, the base station 105 may individually indicate a starting bit position of the WUS to each UE 115 that corresponds to a start of a respective block intended for each UE 115. In some examples, the base station 105 may configure and indicate the starting bit position (e.g., in the DCI 2_6 message for the WUS) to each UE 115 using an IE (e.g., a ps-PositionDCI-2-6 IE). Additionally, the base station 105 may configure and indicate a total size of the WUS in an additional IE (e.g., sizeDCI-2-6 IE) to each UE 115. Table 1 illustrates an example configuration for a WUS that includes three blocks (e.g., for three UEs 115).

TABLE 1

WUS Configuration

| Field | | Size (Number of Bits) |
| --- | --- | --- |
| Block Number 1 | Wake-Up Indication | 1 |
| | SCell Dormancy Indication | 0-5 |
| Block Number 2 | Wake-Up Indication | 1 |
| | SCell Dormancy Indication | 0-5 |
| Block Number 3 | Wake-Up Indication | 1 |
| | SCell Dormancy Indication | 0-5 |

Each block of the WUS may include a first wake-up indication for a special cell (SpCell) for a corresponding UE 115 (e.g., the SpCell may be a PCell for the MCG or a PSCell for the SCG). Accordingly, this first wake-up indication may be one or more bits, such as a single bit, to indicate whether the UE 115 is to wake up the SpCell for a next on duration. Additionally, in some examples, the UE 115 may either wake up all SCells along with the SpCell (e.g., PCell or PSCell), or the base station 105 may include an SCell dormancy indication in the WUS that signals a bitmap to indicate which SCell group the UE 115 is to wake up for the next on duration. For example, the base station 105 may configure a mapping between SCell to SCell group (e.g., dormancy group, SCell dormancy group, etc.) based on a parameter (e.g., DormancyGroupId) of the associated SCell index when configuring the SCell(s). In some examples, the base station 105 may configure up to five (5) SCell groups (e.g., or a greater number of SCell groups), where each bit of an SCell dormancy indication in a corresponding block of the WUS may correspond to a separate SCell group (e.g., up to five (5) bits to indicate each of the up to five (5) SCell groups). A most significant bit (MSB) of the SCell dormancy indication may correspond to a first SCell group (e.g., dormancy group identifier (ID)=0). Additionally, an SCell group may contain a single SCell or multiple SCells.

However, when a base station 105 transmits a WUS to multiple UEs 115, one or more UEs 115 of the multiple UEs 115 may have a connection with the base station 105 released or may move to another cell (e.g., of the same base station 105 or a different base station 105). Accordingly, based on the one or more UEs 115 no longer being connected to the base station 105, the base station 105 may reconfigure the WUS for the remaining UEs 115 (e.g., impacted UEs 115) of the multiple UEs 115 minus the one or more UEs 115, and the base station 105 may then send an updated WUS based on the reconfiguring. However, in some examples, it may be difficult to synchronize the change (e.g., reconfiguration) of the WUS when the WUS is transmitted to multiple UEs 115. Accordingly, one or more of the remaining UEs 115 may not receive the reconfiguration (e.g., due to radio link conditions, processing delays, network bugs, etc.) or may not reply with a reconfiguration complete message, but the base station 105 may still transmit the WUS according to the reconfiguration (e.g., a new WUS format). For example, a UE 115 may not receive the reconfiguration which changes its starting bit position for reading the WUS (e.g., from bit 8 to bit 4 of the WUS), leading the UE 115 to receive a portion of the WUS not intended for it or for the UE 115 to detect an error if the size of the WUS is smaller than the initially configured starting bit position (e.g., the reconfigured WUS may be equal to or less than 8 bits, but the UE 115 may still attempt to start reading the WUS at the eighth bit, resulting in an error).

Wireless communications system 100 may support techniques for handling WUS errors at a UE 115. For example, the UE 115 may detect an error pattern when attempting to receive a WUS from a base station 105 based on a configuration for receiving the WUS. Based on detecting the error pattern, the UE 115 may then perform a mitigation operation based on determining the error pattern, such as waking up multiple cells to receive a transmission in an on duration indicated by the WUS, transmitting an RLF indication to the base station (e.g., to release a connection with the base station), etc. In some examples, the error pattern may include a size of the WUS being different than the size of the WUS indicated in the configuration, the size of the WUS being smaller than or equal to the starting bit position for the UE 115 to read of the WUS indicated in the configuration, that a number of bits for an SCell dormancy indication in the WUS is different than a number of dormancy groups for the UE 115, that the WUS indicates for the UE 115 to not wake up an SpCell (e.g., PCell or PSCell) but for the UE 115 to wake up one or more SCells, other conditions, or any combination thereof. Additionally or alternatively, the base station 105 may transmit multiple WUSs to at least some of the UE 115 and the additional UEs 115, such as transmitting a first WUS according to the configuration and a second WUS according to a reconfiguration.

Figure 2:
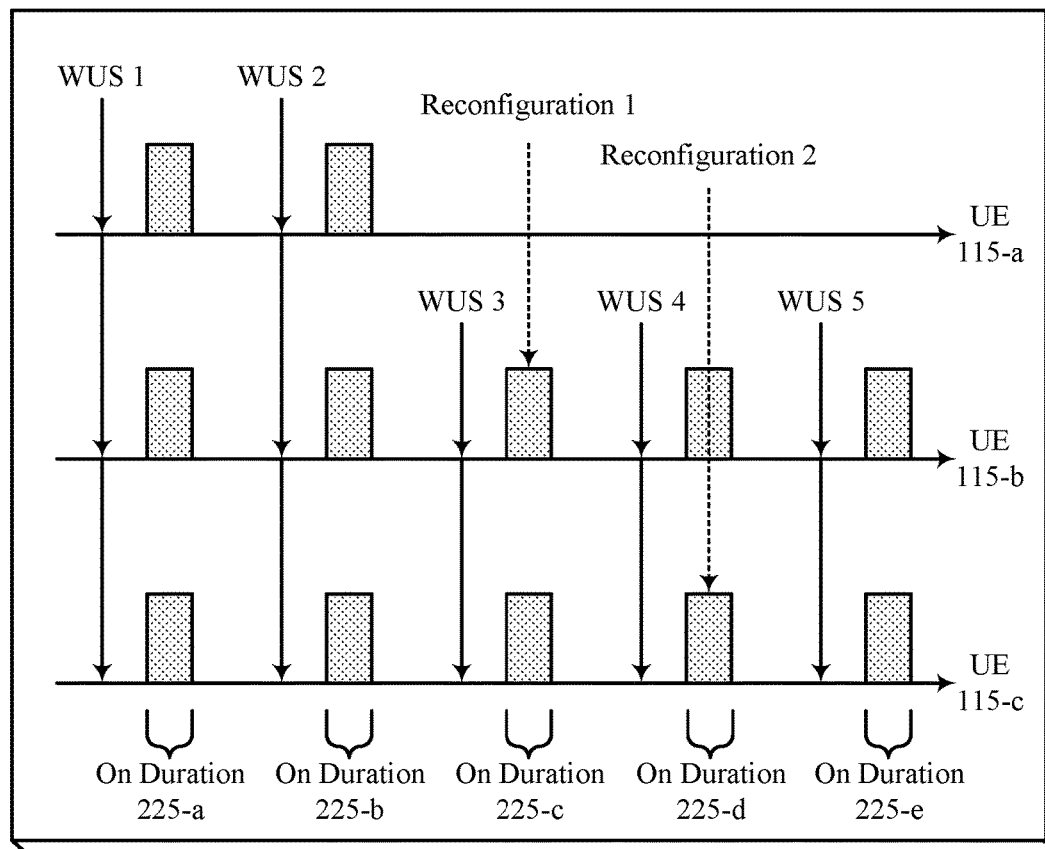
FIG. 2 illustrates an example of a wireless communications system that supports WUS error handling in accordance with aspects of the present disclosure.
Figure 2:
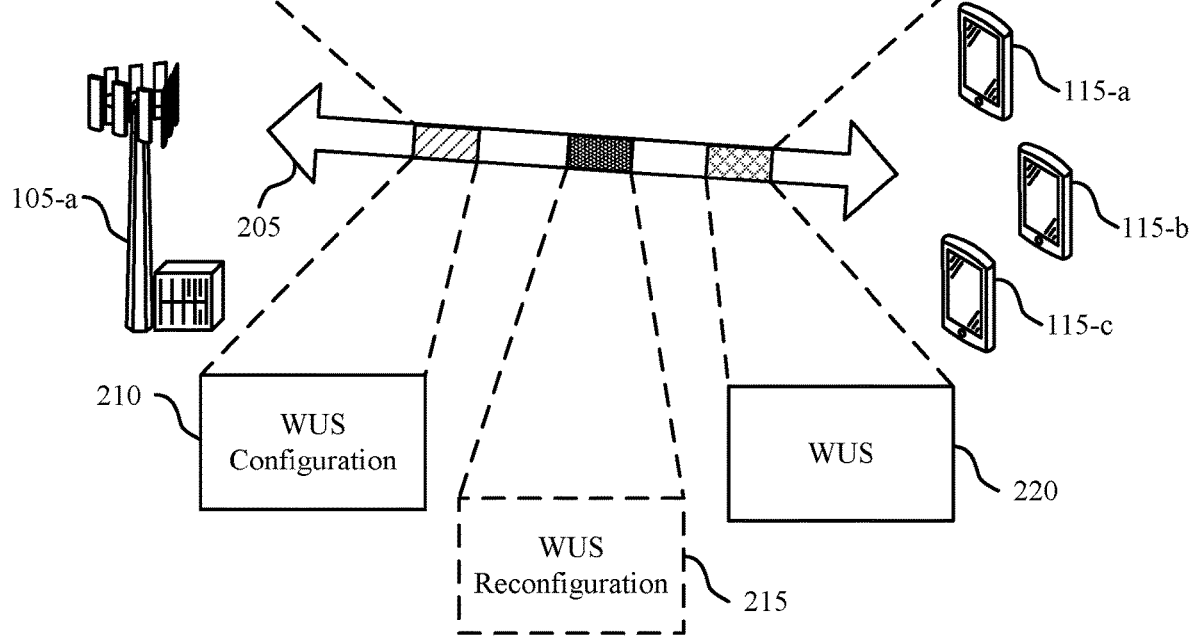

FIG. 2 illustrates an example of a wireless communications system 200 that supports WUS error handling in accordance with aspects of the present disclosure. In some examples, wireless communications system 200 may implement aspects of or may be implemented by aspects of wireless communications system 100. For example, wireless communications system 200 may include a base station 105-a, a first UE 115-a, a second UE 115-b, and a third UE 115-c, which may represent examples of corresponding base stations 105 and UEs 115, respectively, as described with reference to FIG. 1. Additionally, first UE 115-a, second UE 115-b, and third UE 115-c may be configured to communicate with base station 105-a on resources of a carrier 205 (e.g., or separate carriers) in a DRX mode (e.g., CDRX mode). Additionally, the UEs 115 may be configured to communicate with base station 105-a using a CA configuration, a dual connectivity configuration, or both, where at least some of the UEs 115 if not each UE 115 may be further configured with an MCG (e.g., including a PCell and one or more SCells) and an SCG (e.g., including a PSCell and one or more SCells) for the communications with base station 105-*a*.

In some examples, the UEs 115 may be configured with the DRX mode to, for example, save battery power. As part of the DRX mode, the UEs 115 may utilize a DRX cycle when communicating with base station 105-*a* that includes a periodic switching (e.g., on and off) of a receiver. DRX cycles may be configured in the downlink direction so that the UEs 115 do not have to decode a PDCCH or do not have to receive physical downlink shared channel (PDSCH) transmissions in certain subframes. In some cases, UE 115-*a* may monitor a wireless link continuously for an indication that UE 115-*a* is to receive data, which may expend battery power. Accordingly (e.g., to conserve power and extend battery life), the UEs 115 may be configured with the DRX cycle (e.g., by base station 105-*a*). The DRX cycle may consist of an on duration (e.g., an active time, an active period, etc.) when the UEs 115 may monitor for control information (e.g., on PDCCH) and a DRX period (e.g., sleep period, inactive time, etc.) when the UEs 115 may power down their radio components. In some cases, the UEs 115 may be configured with a DRX short cycle and a DRX long cycle. For example, the UEs 115 may enter a DRX long cycle if the UEs 115 are inactive for one or more DRX short cycles. The transition between the DRX short cycle, the DRX long cycle, and continuous reception may be controlled by an internal timer or by messaging from base station 105-*a*. In some examples, each UE 115 may have different DRX cycles, or base station 105-*a* may configure a common DRX cycle for all UEs 115.

In some cases, the UEs 115 may monitor for and receive one or more scheduling messages on a PDCCH during the on duration(s). While monitoring the PDCCH for a scheduling message, the UEs 115 may initiate a DRX inactivity timer (e.g., drx-InactivityTimer). If a scheduling message is successfully received, the UEs 115 may prepare to receive data indicated by the scheduling message, and the DRX inactivity timer may be reset. When the DRX inactivity timer expires without receiving a scheduling message, the UEs 115 may transition to the DRX period (e.g., become inactive). Additionally or alternatively, the UEs 115 may move into a DRX short cycle and may start a DRX short cycle timer. When the DRX short cycle timer expires, UE 115-*a* may resume a DRX long cycle.

Additionally, the DRX cycle may include a CDRX mode, where the UEs 115 stay connected to base station 105-*a* during both the on durations (e.g., awake durations) and the DRX periods (e.g., sleep periods). The CDRX mode may enable the UEs 115 to make signal-free transitions between sleep and awake states (e.g., the DRX periods and on durations, respectively, or sleep and awake modes). Base station 105-*a* may schedule PDCCH/PDSCH transmissions during active times (e.g., awake states, on durations, etc.). Additionally, the UEs 115 may monitor a PDCCH (i.e., wake up or be awake) during the active times. In some cases, the active times may include when an on-duration timer is running, an inactive-timer is running, a scheduling request is pending, or a combination thereof. Except for the active times, the UEs 115 may sleep to save battery power while in the CDRX (or DRX) mode.

In some examples, before an on duration of a DRX cycle, base station 105-*a* may transmit a WUS to the UEs 115 indicating which UEs 115 are to wake up for the next on duration (e.g., and which cells of those UEs 115 that are to wake up). For example, as described with reference to FIG. 1, base station 105-*a* may configure a WUS with multiple blocks, where each block is configured for a respective UE 115 of the UEs 115. Accordingly, base station 105-*a* may transmit a WUS configuration 210 to the UEs 115 to indicate how each UE 115 should read and receive the WUS (e.g., using IEs indicating a starting bit location of the WUS for each UE 115 to start reading the WUS, a total size of the WUS, etc.). For example, base station 105-*a* may configure a first block of the WUS for first UE 115-*a*, a second block of the WUS for second UE 115-*b*, and a third block of the WUS for third UE 115-*c*. Based on WUS configuration 210, first UE 115-*a* may start reading the WUS at a bit corresponding to the start of the first block, second UE 115-*b* may start reading the WUS at a bit corresponding to the start of the second block, and third UE 115-*c* may start reading the WUS at a bit corresponding to the start of the third block.

As described herein, in some cases, one or more of the UEs 115 for which the WUS is configured (e.g., initially configured, previously configured) may have a connection with base station 105-*a* released or may go to another cell (e.g., of the same base station 105 or a different base station 105). Based on the one or more UEs 115 no longer being connected to base station 105-*a*, base station 105-*a* may reconfigure the WUS for the remaining UEs 115 (e.g., impacted UEs 115) of the multiple UEs 115 minus the one or more UEs 115 and may transmit a WUS reconfiguration 215 indicating the reconfiguring. For example, first UE 115-*a* may have its connection to base station 105-*a* released or transferred to another cell, such that the first block of the WUS configured for first UE 115-*a* may be removed with the reconfiguration. Subsequently, base station 105-*a* may then transmit the WUS reconfiguration 215 to second UE 115-*b* and third UE 115-*c* to indicate new configuration information for those UEs 115 to receive the reconfigured WUS (e.g., updated starting bit positions in the WUS for each UE 115 to start reading the reconfigured WUS, updated total size of the reconfigured WUS, etc.).

However, it may be difficult to synchronize the change (e.g., reconfiguration) of the WUS when the WUS is transmitted to multiple UEs 115. For example, one or more of the remaining UEs 115 may not receive the reconfiguration (e.g., due to radio link conditions, processing delays, network bugs, etc.) or may not reply with a reconfiguration complete message, but the base station 105 may still transmit the WUS according to the reconfiguration (e.g., a new WUS format). As an example, third UE 115-*c* may not receive WUS reconfiguration 215 which changes its starting bit position for reading a WUS 220 (e.g., from bit 8 to bit 4 of WUS 220), leading third UE 115-*c* to receive a portion of WUS 220 not intended for it or for third UE 115-*c* to detect an error if the size of WUS 220 is smaller than the initially configured starting bit position (e.g., the reconfigured WUS may be equal to or less than 8 bits, but third UE 115-*c* may still attempt to start reading WUS 220 at the eighth bit, resulting in an error).

Using the techniques described herein, a UE 115 may detect one or more error patterns in one or more received WUSs (e.g., WUS 220) and may perform one or more mitigation operations based on the detected error pattern. For example, when there is a detected error pattern, the UE 115 may wake up a PCell and all SCells in an MCG (e.g., or a PSCell and all SCells in an SCG) for a next on duration to potentially receive any transmissions from base station 105-*a*. Additionally or alternatively, if there are continuous detected error patterns for the received WUS (e.g., a number of consecutive error patterns are detected for consecutive WUS opportunities/receptions that satisfy or exceed a threshold value), the UE 115 may enter RLF to release a connection or link with base station 105-*a*, which may include the UE 115 transmitting an RLF indication to base station 105-*a*, and the UE 115 may then attempt to reestablish its link with base station 105-*a* to see if the problem associated with the error pattern(s) goes away. For example, the UE 115 may send a reestablishment request to base station 105-*a* if the problem occurs in the MCG, or the UE 115 may send SCG failure information for a first dual connectivity configuration (e.g., NRDC) or NR SCG failure information for a second dual connectivity configuration (e.g., ENDC) if the problem occurs in the SCG. If the problems persist, the UE 115 may release its connection with base station 105-*a* locally and may set up a connection with base station 105-*a* again to fix the problem.

In some examples, the error pattern may be one or more error patterns of a set of possible error patterns for which the UE 115 monitors and may then perform a corresponding one or more mitigation operations (e.g., wake up all cells, report RLF, release connection, etc.). For example, the set of error patterns may include the UE 115 determining a size of WUS 220 (e.g., a size of DCI Format 2_6 message carrying the WUS) is smaller than (or larger than) a size of the WUS indicated in a previous configuration (e.g., WUS configuration 210). Additionally or alternatively, the set of error patterns may include the UE 115 determining the size of WUS 220 is smaller than (or equal to) a starting bit position configured for the UE 115 (e.g., indicated in WUS configuration 210). Additionally or alternatively, if the UE 115 is configured to monitor for or read a last block in the WUS, the set of error patterns may include the UE 115 determining that the WUS includes fewer bits for an SCell dormancy indication (e.g., as discussed and shown with reference to Table 1) than a number of SCell dormancy groups (e.g., NrofDormancyGroups) configured for the UE 115. Additionally or alternatively, the set of error patterns may include the UE 115 determining that a wake-up indication in the WUS (e.g., for an SpCell, such as the PCell or PSCell) is set to "0" (e.g., indicating that the UE 115 should not wake up the SpCell for a next on duration) but at least one bit in the SCell dormancy indication is set to "1" (e.g., indicating for the UE 115 to wake up one or more SCells or SCell groups). For example, the wake-up indication should be "1" if at least one bit in the SCell dormancy indication is set to "1," such that if the wake-up indication is "0" and at least one bit in the SCell dormancy indication is "1," an error pattern is detected.

As shown in the example of FIG. 2, base station 105-*a* may transmit a WUS to the UEs 115 before different on durations 225 of a DRX cycle to indicate which UEs 115 and which cells of those indicated UEs 115 should wake up for a next occurring on duration 225. For example, base station 105-*a* may transmit a first WUS (e.g., WUS 1) before a first on duration 225-*a*. This first WUS may include, for example, three (3) blocks: a first block for first UE 115-*a*, a second block for second UE 115-*b*, and a third block for third UE 115-*c*. Each block may include, for example, four (4) bits (e.g., or a greater number of bits) for each UE 115, where a first bit carries a wake-up indication (e.g., single bit) for the corresponding UE 115 and the remaining three (3) bits carry an SCell dormancy indication indicating which SCells or SCell groups for the UE 115 to wake up. Accordingly, based on each block containing, for example, four (4) bits, base station 105-*a* may configure each UE 115 with a corresponding starting bit location to read of the first WUS (e.g., a ps-PositionDCI-2-6 IE as part of WUS configuration 210), where first UE 115-*a* is configured with a first starting bit location (e.g., bit 0 of the first WUS, such that ps-Position-DCI-2-6=0 for first UE 115-*a*), second UE 115-*a* is configured with a second starting bit location (e.g., bit 4 of the first WUS, such that ps-PositionDCI-2-6=4 for second UE 115-*b*), and third UE 115-*c* is configured with a third starting bit location (e.g., bit 8 of the first WUS, such that ps-Position-DCI-2-6=8 for third UE 115-*c*). Additionally, the first WUS may include a total size of, for example, 12 bits based on the three configured blocks (e.g., sizeDCI-2-6=12), where this total size is also indicated to each UE 115.

For example, the first block of the first WUS may include a {1, 011} indication for first UE 115-*a*, which indicates for first UE 115-*a* to wake up (e.g., wake up a PCell or PSCell) for first on duration 225-*a* based on the first "1" and for first UE 115-*a* to wake up a second and third configured SCell dormancy group (e.g., or a second and third SCell) based on the "011." Additionally, the second block of the first WUS may include a {0, 000} indication for second UE 115-*b*, which indicates for second UE 115-*b* to not wake up any cells for first on duration 225-*a*. Additionally, the third block of the first WUS may include a {1, 111} indication for third UE 115-*c*, which indicates for third UE 115-*a* to wake up for first on duration 225-*a* based on the first "1" and for third UE 115-*c* to wake up a first, second, and third configured SCell dormancy group based on the "111."

Each UE 115 may monitor for and receive a corresponding block of the first WUS based on an initial or previously received WUS configuration (e.g., WUS configuration 210). Additionally, each UE 115 may monitor for and receive corresponding blocks of a second WUS (e.g., WUS 2) to indicate which UEs 115 (and which cells) should wake up for a second on duration 225-*b* based on the initial or previously received WUS configuration (e.g., using the respective previously configured starting bit locations). The second WUS may include same or different wake up indications as the first WUS.

Subsequently, during second on duration 225-*b* or after second on duration 225-*b* but before a third WUS transmission (e.g., WUS 3), first UE 115-*a* may have its connection to base station 105-*a* released or transferred to another cell. As such, the initial or previously received WUS configuration that includes the first block configured for first UE 115-*a* may no longer be valid. Base station 105-*a* may then reconfigure the WUS and transmit a reconfiguration (e.g., WUS reconfiguration 215) for the remaining UEs 115 (e.g., second UE 115-*b* and third UE 115-*c*) to receive WUSs based on the reconfiguration. For example, the reconfiguration for the WUS may include two (2) blocks (e.g., a first block for second UE 115-*b* and a second block for third UE 115-*c*), as opposed to the three (3) blocks previously configured for the WUS. Accordingly, starting bit locations for each UE 115 and a total size of the WUS may change from the received configuration (e.g., the initial/previously received configuration) to the reconfiguration for the WUS. However, as described, it may be difficult to synchronize this reconfiguration (e.g., change) for the WUS, such that one or both of the remaining UEs 115 do not receive the reconfiguration before a next WUS transmission.

For example, base station 105-*a* may transmit the third WUS to second UE 115-*b* and third UE 115-*c* before a third on duration 225-*c*. However, since neither second UE 115-*b* nor third UE 115-*c* have not received the reconfiguration for the WUS, second UE 115-*a* and third UE 115-*c* may use the initial/previously received configuration for the WUS when attempting to receive a corresponding block in the WUS, while base station 105-*a* uses the reconfiguration to transmit the third WUS. That is, second UE 115-*b* may attempt to start reading the third WUS starting at the second starting bit location (e.g., bit 4), and third UE 115-*c* may attempt to start reading the third WUS starting at the third starting bit location (e.g., bit 8). Based on the reconfiguration, though, base station 105-*a* may transmit a block intended for second UE 115-*b* starting at bit 0 and may transmit a block intended for third UE 115-*c* starting at bit 4. As such, since second UE 115-*b* attempts to start reading the WUS at bit 4, second UE 115-*b* may receive wake-up indications intended for third UE 115-*c*, and third UE 115-*c* may detect an error if there is no bit 8 in the third WUS.

Rather than having these potential issues, based on the techniques described herein, at least one of if not both of second UE 115-*b* and third UE 115-*c* may determine an error pattern occurs when receiving the third WUS. For example, with the first block removed from the initial/previously received WUS configuration in comparison to the reconfiguration, a total size of the third WUS may be different (e.g., smaller) than an expected total size of the WUS indicated in the initial/previously received WUS configuration. Accordingly, second UE 115-*b* and third UE 115-*c* may detect this discrepancy as an error pattern and may perform a mitigation operation (e.g., wake up all cells of the MCG or SCG or both) for third on duration 225-*c* so that second UE 115-*b* and third UE 115-*c* have increased chances of receiving any downlink transmissions intended for them during third on duration 225-*c* even though neither UE 115 successfully received a corresponding wake-up indication for themselves in the third WUS. Additionally or alternatively, third UE 115-*c* may determine the size of the third WUS (e.g., eight (8) bits) is smaller than (or equal to) a starting bit position configured for third UE 115-*c* (e.g., bit 8).

In some examples, during third on duration 225-*c*, second UE 115-*b* may receive the reconfiguration (e.g., reconfiguration 1) for receiving subsequent WUSs, where the reconfiguration configures second UE 115-*b* with an updated starting bit location (e.g., bit 0) to read of a WUS and an updated total WUS size (e.g., eight (8) total bits). Subsequently, second UE 115-*b* may apply the reconfiguration when receiving a fourth WUS (e.g., WUS 4). For example, the fourth WUS may include a first block with a {1, 000} indication for second UE 115-*b* and a second block with a {1, 111} indication for third UE 115-*c*. Accordingly, using the reconfiguration, second UE 115-*b* may receive the first block with the {1, 000} indication in the fourth WUS and may wake up its SpCell (e.g., PCell or PSCell) for a fourth on duration 225-*d*. However, third UE 115-*c* may still attempt to read the fourth WUS starting at bit 8, which may lead to errors if the total size of the fourth WUS is eight (8) bits total. As such, third UE 115-*c* may perform a mitigation operation again (e.g., wake up all cells of the MCG or SCG or both, report RLF, etc.) based on detecting an error pattern for the fourth WUS. For example, third UE 115-*c* may determine the total size of the fourth WUS is still different than an expected total size indicated in the initial/previously received WUS configuration (e.g., 12 bits) or may determine the size of the fourth WUS (e.g., eight (8) bits) is smaller than (or equal to) a starting bit position configured for third UE 115-*c* (e.g., bit 8).

Subsequently, during fourth on duration 225-*d*, third UE 115-*c* may receive the reconfiguration (e.g., reconfiguration 2) for receiving subsequent WUSs, where the reconfiguration configures third UE 115-*c* with an updated starting bit location (e.g., bit 4) to read of a WUS and an updated total WUS size (e.g., eight (8) total bits). Accordingly, both second UE 115-*b* and third UE 115-*c* may apply the reconfiguration when receiving a fifth WUS (e.g., WUS 5) before a fifth on duration 225-*e* and may read the fifth WUS properly to wake up indicated cells for the fifth on duration 225-*e*. When second UE 115-*b* receives the reconfiguration (e.g., during third on duration 225-*c*) and when third UE 115-*c* receives the reconfiguration (e.g., during fourth on duration 225-*d*), both UEs 115 may transmit a reconfiguration complete message (e.g., RRCReconfigurationComplete message) to base station 105-*a* to indicate successful reception of the reconfiguration.

Additionally or alternatively, during a transition time for transitioning from the initial/previously received WUS configuration to the reconfiguration, base station 105-*a* may transmit duplicated wake up indications for impacted UEs 115 (e.g., second UE 115-*b* and third UE 115-*c*) in multiple WUSs using the initial/previously received WUS configuration and the reconfiguration. For example, for the third WUS and the fourth WUS, based on one or both UEs 115 not having received the reconfiguration, base station 105-*a* may transmit two (2) WUSs at each instance to second UE 115-*b* and third UE 115-*c*, where a first WUS of the two (2) WUSs is transmitted according to the initial/previously received WUS configuration and a second WUS of the two (2) WUSs is transmitted according to the reconfiguration.

Accordingly, second UE 115-*b* and third UE 115-*c* may use a corresponding configuration or reconfiguration based on which configuration/reconfiguration was last received. For example, for the third WUS, both second UE 115-*b* and third UE 115-*c* may use the initial/previously received WUS configuration to receive the first WUS of the two (2) WUSs because neither UE 115 has received the reconfiguration yet. For the fourth WUS, second UE 115-*b* may use the reconfiguration to receive the second WUS of the two (2) WUSs, and third UE 115-*c* may use the initial/previously received WUS configuration to receive the first WUS of the two (2) WUSs based on third UE 115-*c* still not receiving the reconfiguration. For the fifth WUS, both second UE 115-*b* and third UE 115-*c* may use the reconfiguration to receive the fifth WUS. Base station 105-*a* may stop sending WUSs according to the initial/previously transmitted WUS configuration after receiving reconfiguration complete messages from all impacted UEs 115 (e.g., second UE 115-*b* and third UE 115-*c* in the example of FIG. 2).

To differentiate which WUS is transmitted according to the initial/previously received WUS configuration and which WUS is transmitted according to the reconfiguration, base station 105-*a* may use different RNTIs (e.g., PS-RNTIs, PS RNTIs, etc.) for each WUS. For example, the initial/previously received WUS configuration may include an indication of a first RNTI that is used to scramble a CRC (e.g., a first CRC) of WUSs transmitted according to the initial/previously received WUS configuration. Additionally, the reconfiguration may include an indication of a second RNTI that is used to scramble a CRC (e.g., a second CRC) of WUSs transmitted according to the reconfiguration. Accordingly, based on which configuration or reconfiguration that is most recently received at a UE 115, the UE 115 may determine which WUS to monitor for and receive based on which WUS includes the corresponding RNTI from the configuration or reconfiguration. For example, if the UE 115 most recently received the initial/previous WUS configuration, the UE 115 may monitor for and receive a WUS that uses the first RNTI to scramble its CRC. Additionally or alternatively, if the UE 115 most recently received the reconfiguration, the UE 115 may monitor for and receive a WUS that uses the second RNTI to scramble its CRC. Using the different RNTI values may support WUS error handling for multiple UEs 115 with different configuration update times.

While three (3) UEs 115 are described and shown in the example of FIG. 2, it is to be understood that a greater number or fewer UEs 115 may be configured to receive WUSs from base station 105-a and detect error patterns as described herein.

Figure 3:
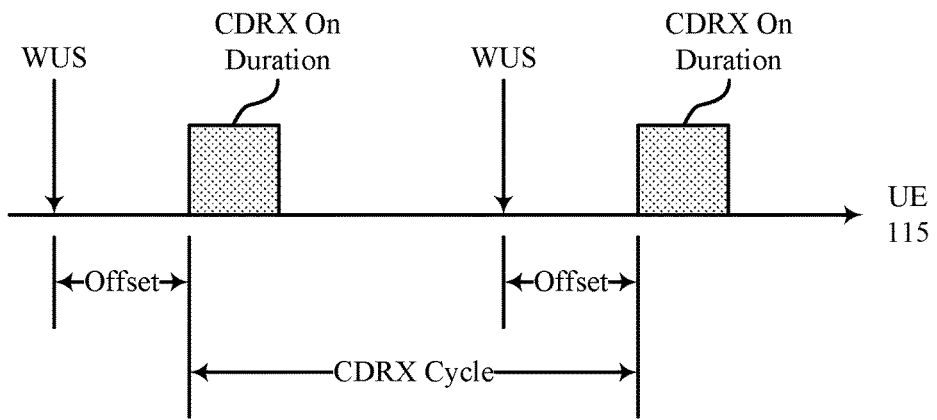
FIG. 3 illustrates an example of a flowchart in accordance with aspects of the present disclosure.
Figure 3:
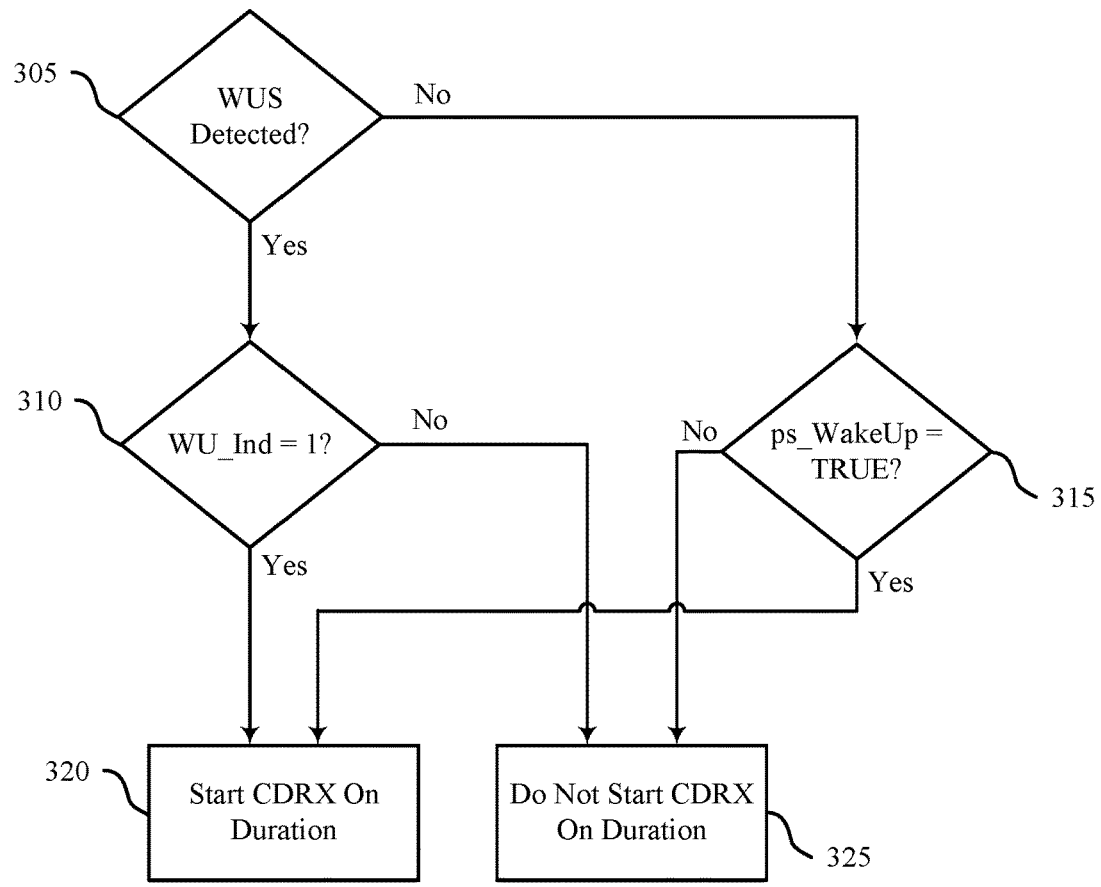

FIG. 3 illustrates an example of a flowchart 300 in accordance with aspects of the present disclosure. In some examples, flowchart 300 may implement aspects of or may be implemented by aspects of wireless communications system 100, wireless communications system 200, or both. For example, a UE 115 may perform an operation based on flowchart 300 to support communications with an additional device (e.g., a base station 105).

The UE 115 may be configured to operate according to a CDRX mode as described with reference to FIGS. 1 and 2. For example, the CDRX mode may include a DRX or CDRX cycle for communicating with the additional device that includes a periodic switching (e.g., on and off) of a receiver. The UE 115 may switch on the receiver during CDRX on durations (e.g., active times, active states, etc.) to enable communications with the additional device and may switch off the receiver during remaining portions of the DRX/CDRX cycle (e.g., inactive times, inactive states, sleep durations, etc.). Additionally, before a CDRX on duration, the additional device may transit a WUS to the UE 115 to indicate whether the UE 115 shall wake up for a next CDRX on duration or not. In some examples, the additional device may transmit the WUS to the UE 115 according to an offset value (e.g., slots, subframes, milliseconds, etc.) before a start of the CDRX on duration. The additional device may configure this offset and indicate the offset to the UE 115.

The UE 115 may perform operations of flowchart 300 to determine whether to wake up or not for a CDRX on duration after receiving or detecting a WUS. For example, at 305, the UE 115 may determine whether a WUS is detected or not (e.g., regardless of whether it was successfully received). If a WUS is detected, the UE 115 may proceed to 310, where the UE 115 determines whether a wake-up indication in the WUS is toggled or not. For example, as described with reference to FIGS. 1-2 and Table 1, the WUS may include multiple bits intended for the UE 115 (e.g., in a configured block of the WUS), where the multiple bits include a first bit for the wake-up indication (e.g., indicating to wake up a PCell or PSCell) and one or more additional bits for an indication of which SCell dormancy groups to wake up for the next CDRX on duration. If the wake-up indication is toggled (e.g., wake-up indication=1 or WU_Ind=1), the UE 115 may proceed to 320 and may start the next CDRX on duration (e.g., waking up the cells indicated in the WUS) to monitor for communications from the additional device. Alternatively, if the indication is not toggled (e.g., wake-up indication=0 or WU_Ind=0), the UE 115 may proceed to 325 and not start the next CDRX on duration (e.g., the UE 115 may remain in an inactive or sleep state).

Additionally or alternatively, at 305, if the WUS is not detected nor received, the UE 115 may proceed to 315, where the UE 115 determines whether an additional wake-up procedure (e.g., ps_WakeUp) has been configured for the UE 115 (e.g., via RRC signaling). If the additional wake-up procedure has been configured and is set to a value, such as "TRUE," the UE 115 may proceed to 320 and may start the next CDRX on duration to monitor for communications from the additional device. Alternatively, if the additional wake-up procedure has not been configured or is set to a different value than "TRUE" (e.g., set to "FALSE"), the UE 115 may proceed to 325 and not start the next CDRX on duration (e.g., the UE 115 may remain in an inactive or sleep state).

As described herein, the UE 115 may perform an additional operation after 305 when receiving a WUS to detect an error pattern for the received or detected WUS. For example, the error pattern may include one of the set of error patterns as described with reference to FIG. 2. If the error pattern has been detected, the UE 115 may perform a mitigation operation as described with reference to FIG. 1. Alternatively, if no error pattern is detected, the UE 115 may proceed to 310 and perform any subsequent operations as described previously. The error detection operation may prevent the UE 115 from reading wrong information in the WUS, while still enabling the mitigation operations to increase chances that transmissions intended for the UE 115 are successfully received during the next CDRX on duration.

Figure 4:
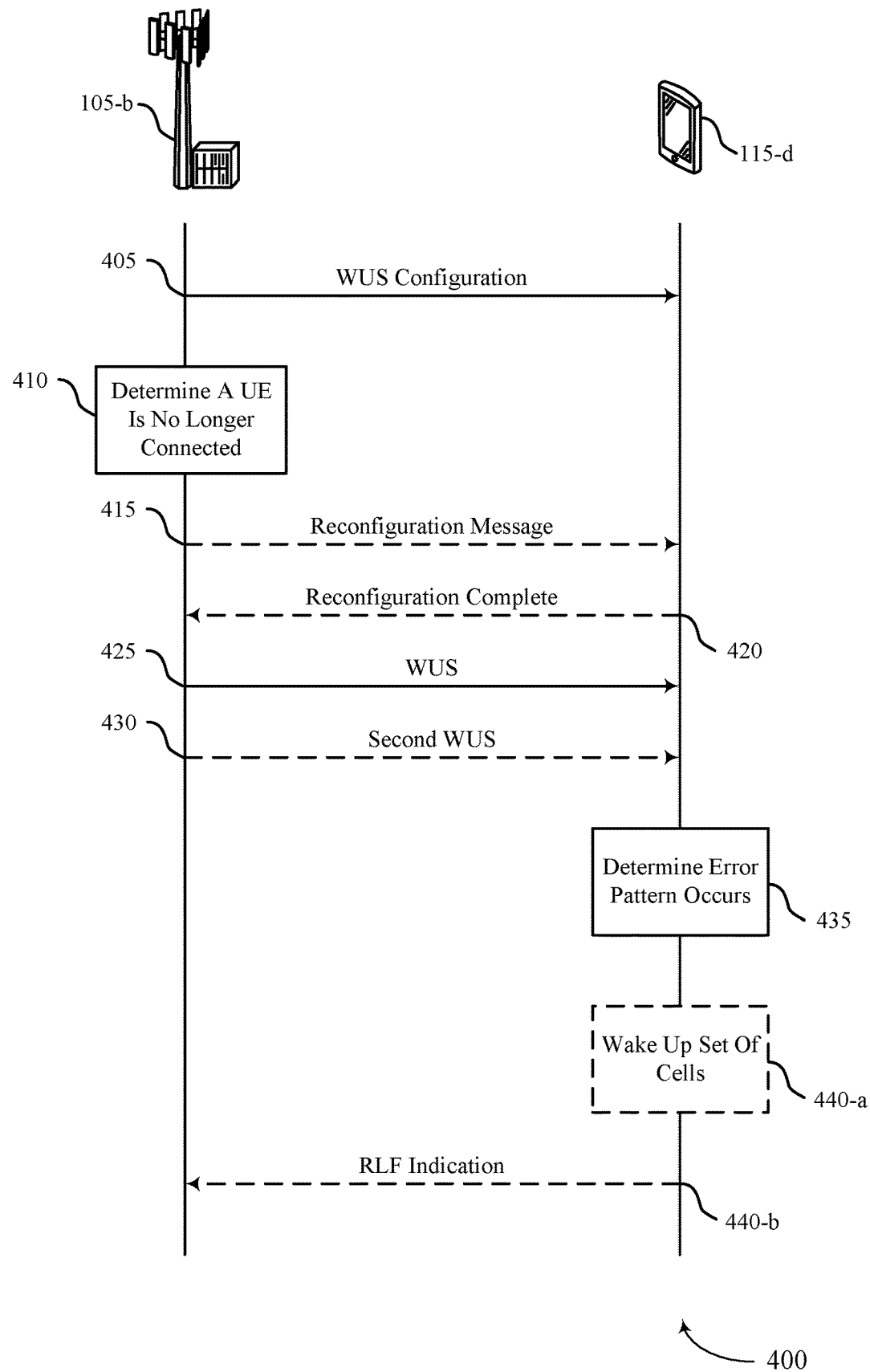
FIG. 4 illustrates an example of a process flow that supports WUS error handling in accordance with aspects of the present disclosure.

FIG. 4 illustrates an example of a process flow 400 that supports WUS error handling in accordance with aspects of the present disclosure. In some examples, process flow 400 may implement aspects of or may be implemented by aspects of wireless communications system 100, wireless communications system 200, or both. For example, process flow 400 may include a base station 105-b and a UE 115-d, which may represent examples of corresponding base stations 105 and UEs 115, respectively, as described with reference to FIGS. 1-3.

In the following description of process flow 400, the operations between UE 115-d and base station 105-b may be performed in different orders or at different times. Certain operations may also be left out of process flow 400, or other operations may be added to process flow 400. It is to be understood that while UE 115-d and base station 105-b are shown performing a number of the operations of process flow 400, any wireless device may perform the operations shown.

At 405, base station 105-b may transmit, to a set of UEs 115 (e.g., including UE 115-d), a configuration for receiving a WUS transmission for the set of UEs 115, the configuration may include a size of the WUS transmission and respective starting bit positions of the WUS transmission for each UE 115 of the set of UEs 115 to read. For example, UE 115-d may receive, from base station 105-b, the configuration for receiving the WUS transmission, the configuration including the size of the WUS transmission and a first starting bit position of the WUS transmission for UE 115-d to read. In some examples, the configuration for the WUS transmission may further include an indication of a first PS-RNTI with which a CRC of the WUS is scrambled.

At 410, base station 105-b may determine that at least one UE 115 of the set of UEs 115 is no longer connected to base station 105-b and may determine that a subset of the set of UEs 115 different than the at least one UE 115 (e.g., the subset of the set of UEs 115 does not include the at least one UE 115) are connected to base station 105-b.

At 415, base station 105-b may transmit, to the subset of the set of UEs 115 (e.g., including UE 115-d), a reconfiguration message for receiving the WUS transmission based on determining that the at least one UE 115 is no longer connected to base station 105-b. For example, UE 115-d may receive the reconfiguration message for the WUS transmission, where the reconfiguration message includes a second size of the WUS transmission different than the size of the WUS transmission, includes a second starting bit position for UE 115-d to read of the WUS transmission different than the first starting bit position, or both. In some examples, the reconfiguration message may further include an indication of a second PS-RNTI with which a CRC of the WUS transmission is scrambled.

In some examples, at 420, UE 115-*d* may transmit, to base station 105-*b*, a reconfiguration complete message indicating successful reception of the reconfiguration message. For example, base station 105-*b* may receive the reconfiguration complete message (e.g., indicating successful reception of the reconfiguration message) from each UE 115 of the subset of the set of UEs 115. Based on receiving the reconfiguration complete message from each UE 115 of the subset of the set of UEs 115, base station 105-*b* may refrain from transmitting a subsequent WUS according to the configuration for the WUS transmission. at 405

At 425, base station 105-*b* may transmit, to the subset of the set of UEs 115, a WUS based on the reconfiguration message. For example, UE 115-*d* may receive the WUS indicating for UE 115-*d* to wake up one or more cells to receive a transmission from base station based on a configured offset between receiving the WUS and receiving the transmission. In some examples, the WUS may be transmitted according to the reconfiguration message based on receiving the reconfiguration complete message from each UE 115 of the subset of the set of UEs 115. However, in some implementations, when receiving the WUS, UE 115-*d* may apply the configuration for the WUS transmission received at 405 rather than applying a reconfiguration for the WUS transmission received with the reconfiguration message, which may lead to issues for UE 115-*d* receiving the WUS properly and successfully. For example, by using the configuration rather than the reconfiguration, UE 115-*d* may read the WUS from a different starting bit position than a starting bit position intended for UE 115-*d* (e.g., causing an error pattern).

At 430, UE 115-*d* may receive, from base station 105-*b*, a second WUS based on the reconfiguration message. In some examples, UE 115-*d* may receive the second WUS based on transmitting the reconfiguration complete message.

For example, at 425, base station 105-*b* may transmit, to the subset of the set of UEs 115, a first WUS according to the configuration for the WUS transmission, where a first CRC of the first WUS is scrambled with the first PS-RNTI included in the configuration for the WUS transmission. In some examples, UE 115-*d* may receive the first WUS based on the first CRC of the WUS being scrambled with the first PS-RNTI. Additionally or alternatively, at 430, base station 105-*b* may transmit, to the subset of the set of UEs 115, a second WUS according to a reconfiguration in the reconfiguration message for the WUS transmission, where a second CRC is scrambled with a second PS-RNTI included in the reconfiguration message for the WUS transmission. For example, UE 115-*d* may receive, from base station 105-*b*, the second WUS with the second CRC scrambled with the second PS-RNTI, where the second WUS indicates for UE 115-*d* to wake up one or more additional cells to receive the transmission from base station 105-*b*.

In some examples, UE 115-*d* may wake up the one or more cells indicated by the WUS based on the configuration for the WUS transmission including the indication of the first PS-RNTI. Additionally or alternatively, UE 115-*d* may wake up the one or more additional cells indicated by the second WUS based on receiving the reconfiguration message including the indication of the second PS-RNTI.

At 435, UE 115-*d* may determine that at least one error pattern of a set of error patterns occurs for the received WUS (e.g., the first WUS, the second WUS, or both). For example, UE 115-*d* may determine that a size of the WUS is different than the size of the WUS transmission indicated in the configuration, that the size of the WUS is smaller than or equal to the starting bit position for UE 115-*d* to read of the WUS transmission indicated in the configuration, that a number of bits for an SCell dormancy indication in the WUS is different than a number of dormancy groups for UE 115-*d*, that the WUS indicates for UE 115-*d* to not wake up a PCell and for UE 115-*d* to wake up one or more SCells, or any combination thereof.

At 440, UE 115-*d* may perform a mitigation operation based on determining the at least one error pattern. For example, at 440-*a*, UE 115-*d* may wake up a set of cells to receive the transmission indicated by the WUS based on determining the at least one error pattern. In some examples, the set of cells may include a PCell of an MCG, one or more SCells of the MCG, a PSCell of an SCG, one or more SCells of the SCG, or any combination thereof.

Additionally or alternatively, UE 115-*d* may transmit, to base station 105-*b*, an RLF indication to release a connection with base station 105-*b* based on determining the at least one error pattern. Subsequently, UE 115-*d* may attempt to reestablish the connection with base station 105-*b* based on transmitting the RLF indication. For example, UE 115-*d* may send a reestablishment request to base station 105-*b* if the problem occurs in the MCG, or UE 115-*d* may send SCG failure information for a first dual connectivity configuration (e.g., NRDC) or NR SCG failure information for a second dual connectivity configuration (e.g., ENDC) if the problem occurs in the SCG. In some examples, UE 115-*d* may determine to transmit the RLF indication based on determining that a number of error patterns for receiving the WUS transmission according to the configuration occur, where the number of error patterns satisfies a threshold value.

Figure 5:
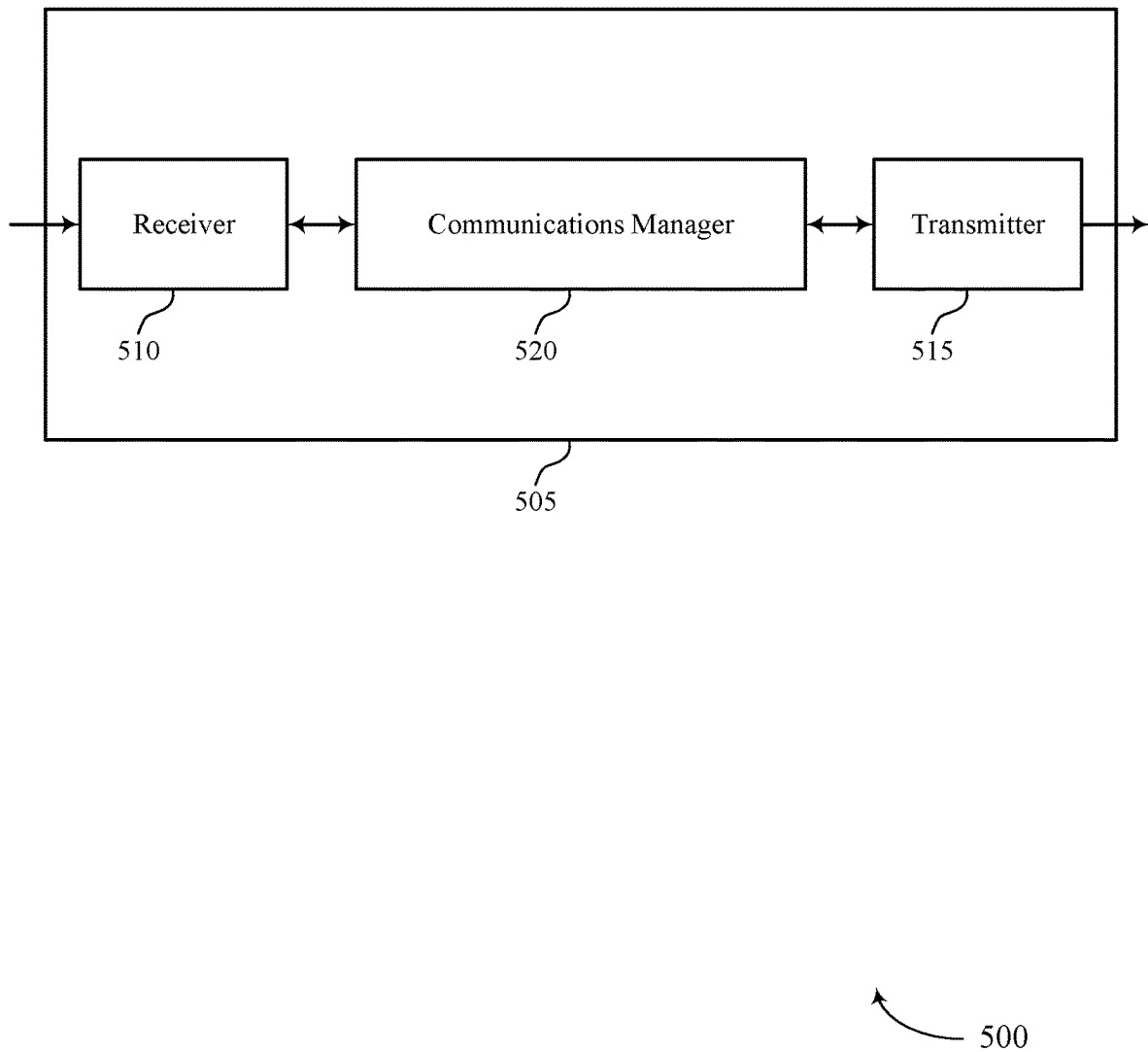
FIGS. 5 and 6 show block diagrams of devices that support WUS error handling in accordance with aspects of the present disclosure.

FIG. 5 shows a block diagram 500 of a device 505 that supports WUS error handling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to WUS error handling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to WUS error handling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of WUS error handling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a configuration for receiving a WUS transmission for a set of multiple UEs including the UE, the configuration including a size of the WUS transmission and a first starting bit position of the WUS transmission for the UE to read. The communications manager 520 may be configured as or otherwise support a means for receiving, from the base station based on the configuration for the WUS transmission, a WUS indicating for the UE to wake up one or more cells to receive a transmission from the base station based on a configured offset between receiving the WUS and receiving the transmission. The communications manager 520 may be configured as or otherwise support a means for determining that at least one error pattern of a set of multiple error patterns occurs for the received WUS. The communications manager 520 may be configured as or otherwise support a means for performing a mitigation operation based on determining the at least one error pattern.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increased reliability for receiving communications from an additional device. For example, based on detecting an error pattern for a WUS and performing a mitigation operation, the device 505 may increase chances that a transmission in an on duration indicated by the WUS is successfully received, thereby increasing reliability.

Figure 6:
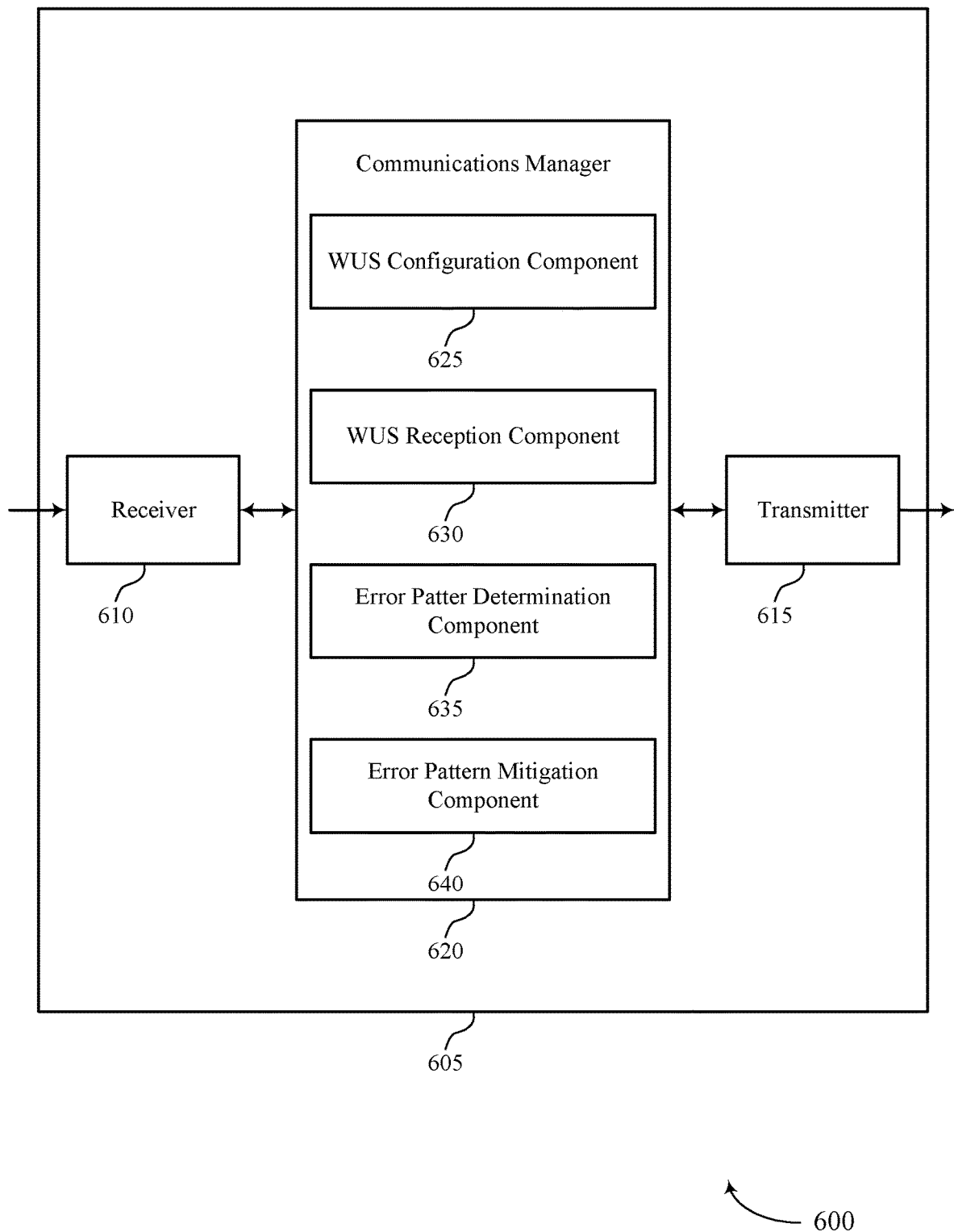

FIG. 6 shows a block diagram 600 of a device 605 that supports WUS error handling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to WUS error handling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to WUS error handling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of WUS error handling as described herein. For example, the communications manager 620 may include a WUS configuration component 625, a WUS reception component 630, an error patter determination component 635, an error pattern mitigation component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The WUS configuration component 625 may be configured as or otherwise support a means for receiving, from a base station, a configuration for receiving a WUS transmission for a set of multiple UEs including the UE, the configuration including a size of the WUS transmission and a first starting bit position of the WUS transmission for the UE to read. The WUS reception component 630 may be configured as or otherwise support a means for receiving, from the base station based on the configuration for the WUS transmission, a WUS indicating for the UE to wake up one or more cells to receive a transmission from the base station based on a configured offset between receiving the WUS and receiving the transmission. The error patter determination component 635 may be configured as or otherwise support a means for determining that at least one error pattern of a set of multiple error patterns occurs for the received WUS. The error pattern mitigation component 640 may be configured as or otherwise support a means for performing a mitigation operation based on determining the at least one error pattern.

Figure 7:
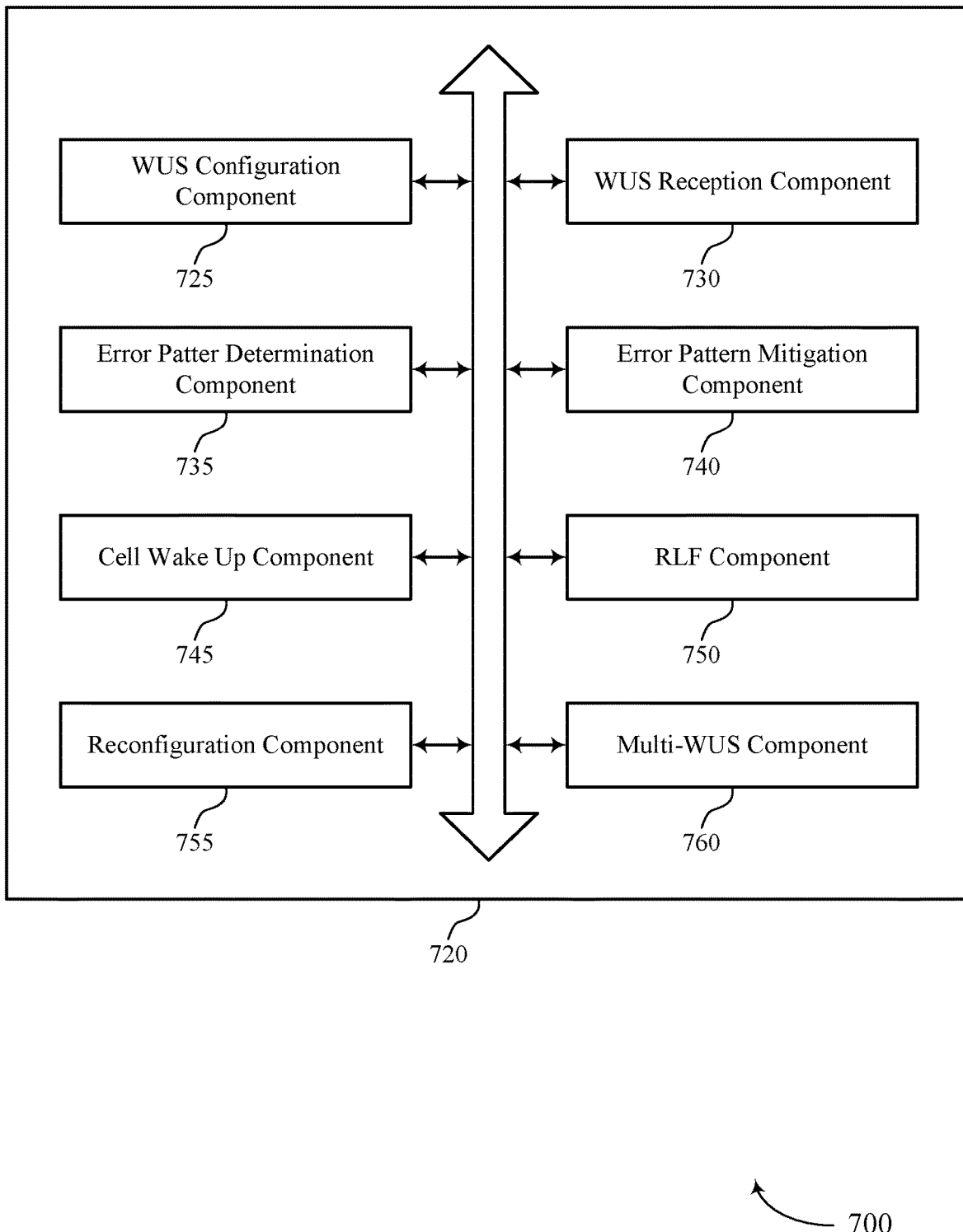
FIG. 7 shows a block diagram of a communications manager that supports WUS error handling in accordance with aspects of the present disclosure.

FIG. 7 shows a block diagram 700 of a communications manager 720 that supports WUS error handling in accordance with aspects of the present disclosure. The communications manager 720 may be an example of aspects of a communications manager 520, a communications manager 620, or both, as described herein. The communications manager 720, or various components thereof, may be an example of means for performing various aspects of WUS error handling as described herein. For example, the communications manager 720 may include a WUS configuration component 725, a WUS reception component 730, an error patter determination component 735, an error pattern mitigation component 740, a cell wake up component 745, an RLF component 750, a reconfiguration component 755, a multi-WUS component 760, or any combination thereof. Each of these components may communicate, directly or indirectly, with one another (e.g., via one or more buses).

The communications manager 720 may support wireless communications at a UE in accordance with examples as disclosed herein. The WUS configuration component 725 may be configured as or otherwise support a means for receiving, from a base station, a configuration for receiving a WUS transmission for a set of multiple UEs including the UE, the configuration including a size of the WUS transmission and a first starting bit position of the WUS transmission for the UE to read. The WUS reception component 730 may be configured as or otherwise support a means for receiving, from the base station based on the configuration for the WUS transmission, a WUS indicating for the UE to wake up one or more cells to receive a transmission from the base station based on a configured offset between receiving the WUS and receiving the transmission. The error patter determination component 735 may be configured as or otherwise support a means for determining that at least one error pattern of a set of multiple error patterns occurs for the received WUS. The error pattern mitigation component 740 may be configured as or otherwise support a means for performing a mitigation operation based on determining the at least one error pattern.

In some examples, to support performing the mitigation operation, the cell wake up component 745 may be configured as or otherwise support a means for waking up a set of multiple cells to receive the transmission indicated by the WUS based on determining the at least one error pattern. In some examples, the set of multiple cells may include a PCell of an MCG, one or more SCells of the MCG, a PSCell of an SCG, one or more SCells of the SCG, or any combination thereof.

In some examples, to support performing the mitigation operation, the RLF component 750 may be configured as or otherwise support a means for transmitting, to the base station, an RLF indication to release a connection with the base station based on determining the at least one error pattern. In some examples, to support performing the mitigation operation, the RLF component 750 may be configured as or otherwise support a means for attempting to reestablish the connection with the base station based on transmitting the RLF indication. In some examples, the RLF component 750 may be configured as or otherwise support a means for determining to transmit the RLF indication based on determining that a number of error patterns for receiving the WUS transmission according to the configuration occur, where the number of error patterns satisfies a threshold value.

In some examples, the reconfiguration component 755 may be configured as or otherwise support a means for receiving, from the base station, a reconfiguration message for the WUS transmission, the reconfiguration message including a second size of the WUS transmission different than the size of the WUS transmission, including a second starting bit position for the UE to read of the WUS transmission different than the first starting bit position, or both. In some examples, the reconfiguration component 755 may be configured as or otherwise support a means for receiving, from the base station, a second WUS based on the reconfiguration message. In some examples, the reconfiguration component 755 may be configured as or otherwise support a means for transmitting, to the base station, a reconfiguration complete message indicating successful reception of the reconfiguration message, where the second WUS is received based on transmitting the reconfiguration complete message.

In some examples, the configuration for the WUS transmission further includes an indication of a first PS-RNTI with which a CRC of the WUS is scrambled, and the multi-WUS component 760 may be configured as or otherwise support a means for receiving the WUS based on the CRC of the WUS being scrambled with the first PS-RNTI. Additionally, the multi-WUS component 760 may be configured as or otherwise support a means for receiving, from the base station, a second WUS with a CRC scrambled with a second PS-RNTI, the second WUS indicating for the UE to wake up one or more additional cells to receive the transmission from the base station.

In some examples, the multi-WUS component 760 may be configured as or otherwise support a means for waking up the one or more cells indicated by the WUS based on the configuration for the WUS transmission including the indication of the first PS-RNTI. Additionally or alternatively, the multi-WUS component 760 may be configured as or otherwise support a means for receiving, from the base station, a reconfiguration message for the WUS transmission, the reconfiguration message including an indication of the second PS-RNTI. In some examples, the multi-WUS component 760 may be configured as or otherwise support a means for waking up the one or more additional cells indicated by the second WUS based on receiving the reconfiguration message including the indication of the second PS-RNTI.

In some examples, to support determining the error pattern of the set of multiple error patterns, the error patter determination component 735 may be configured as or otherwise support a means for determining that a size of the WUS is different than the size of the WUS transmission indicated in the configuration, that the size of the WUS is smaller than or equal to the starting bit position for the UE to read of the WUS transmission indicated in the configuration, that a number of bits for an SCell dormancy indication in the WUS is different than a number of dormancy groups for the UE, that the WUS indicates for the UE to not wake up a PCell and for the UE to wake up one or more SCells, or any combination thereof.

Figure 8:
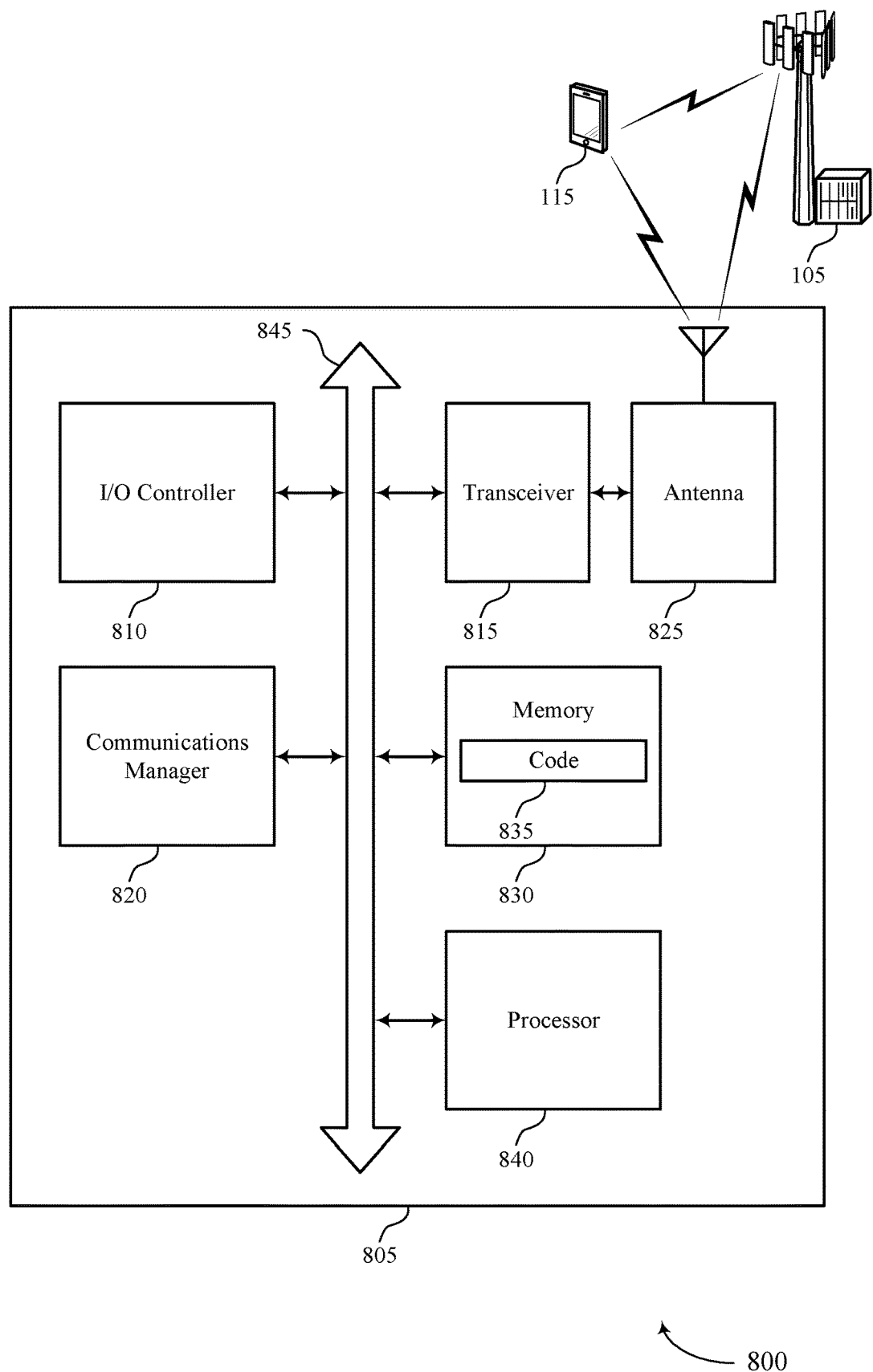
FIG. 8 shows a diagram of a system including a device that supports WUS error handling in accordance with aspects of the present disclosure.

FIG. 8 shows a diagram of a system 800 including a device 805 that supports WUS error handling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting WUS error handling). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a configuration for receiving a WUS transmission for a set of multiple UEs including the UE, the configuration including a size of the WUS transmission and a first starting bit position of the WUS transmission for the UE to read. The communications manager 820 may be configured as or otherwise support a means for receiving, from the base station based on the configuration for the WUS transmission, a WUS indicating for the UE to wake up one or more cells to receive a transmission from the base station based on a configured offset between receiving the WUS and receiving the transmission. The communications manager 820 may be configured as or otherwise support a means for determining that at least one error pattern of a set of multiple error patterns occurs for the received WUS. The communications manager 820 may be configured as or otherwise support a means for performing a mitigation operation based on determining the at least one error pattern.

By including or configuring the communications manager 820 in accordance with examples as described herein, the device 805 may support techniques for improved communication reliability and improved coordination between devices. For example, based on detecting an error pattern for a WUS and performing a mitigation operation, the device 805 may increase chances that a transmission in an on duration indicated by the WUS is successfully received, thereby increasing reliability. Additionally, in some examples, an additional device transmitting the WUS (e.g., a base station 105) may transmit multiple WUSs according to different configurations and with CRCs scrambled with corresponding RNTIs for each of the multiple WUSs. As such, the additional device may coordinate with the device 805 to ensure the configurations for each WUS are successfully received at the device 805 to enable the transmission of the multiple WUSs.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of WUS error handling as described herein, or the processor 840 and the memory 830 may be otherwise configured to perform or support such operations.

Figure 9:
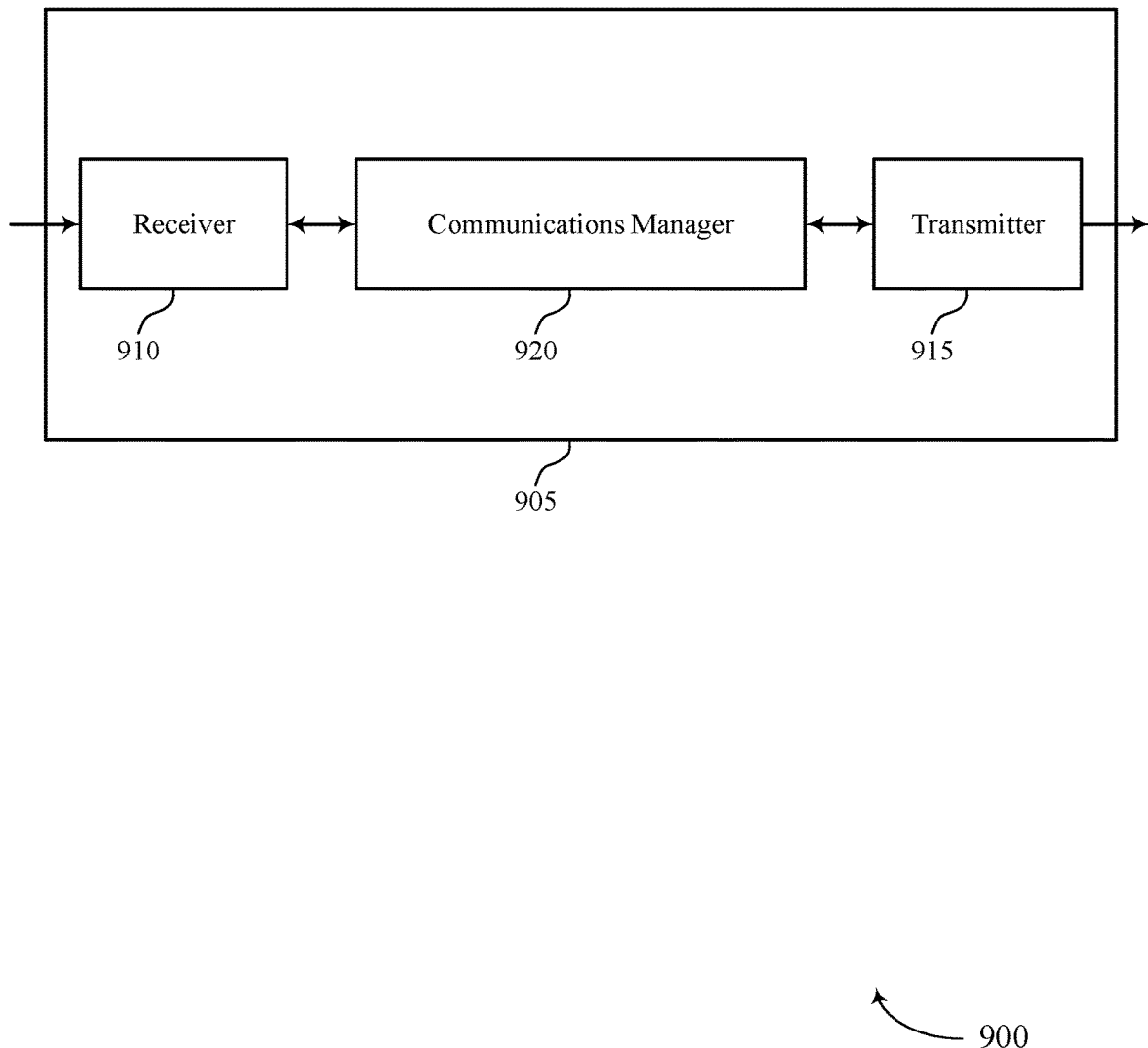
FIGS. 9 and 10 show block diagrams of devices that support WUS error handling in accordance with aspects of the present disclosure.

FIG. 9 shows a block diagram 900 of a device 905 that supports WUS error handling in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to WUS error handling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to WUS error handling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of WUS error handling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read. The communications manager 920 may be configured as or otherwise support a means for determining that at least one UE of the set of multiple UEs is no longer connected to the base station and that a subset of the set of multiple UEs different than the at least one UE are connected to the base station. The communications manager 920 may be configured as or otherwise support a means for transmitting, to the subset of the set of multiple UEs, a reconfiguration message for receiving the WUS transmission based on determining that the at least one UE is no longer connected to the base station. The communications manager 920 may be configured as or otherwise support a means for transmitting, to the subset of the set of multiple UEs, a WUS based on the reconfiguration message.

Figure 10:
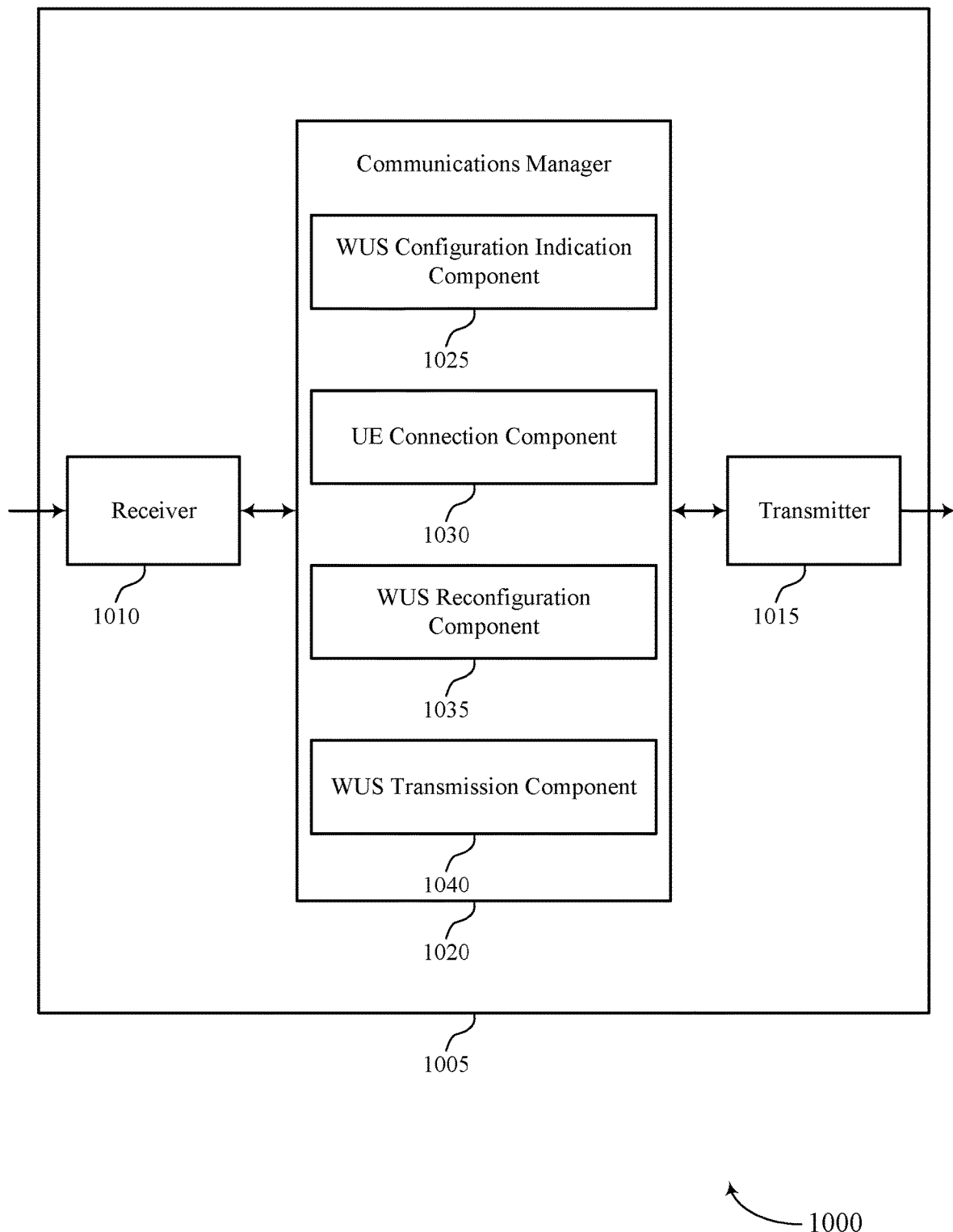

FIG. 10 shows a block diagram 1000 of a device 1005 that supports WUS error handling in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to WUS error handling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to WUS error handling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of WUS error handling as described herein. For example, the communications manager 1020 may include a WUS configuration indication component 1025, a UE connection component 1030, a WUS reconfiguration component 1035, a WUS transmission component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The WUS configuration indication component 1025 may be configured as or otherwise support a means for transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read. The UE connection component 1030 may be configured as or otherwise support a means for determining that at least one UE of the set of multiple UEs is no longer connected to the base station and that a subset of the set of multiple UEs different than the at least one UE are connected to the base station. The WUS reconfiguration component 1035 may be configured as or otherwise support a means for transmitting, to the subset of the set of multiple UEs, a reconfiguration message for receiving the WUS transmission based on determining that the at least one UE is no longer connected to the base station. The WUS transmission component 1040 may be configured as or otherwise support a means for transmitting, to the subset of the set of multiple UEs, a WUS based on the reconfiguration message.

Figure 11:
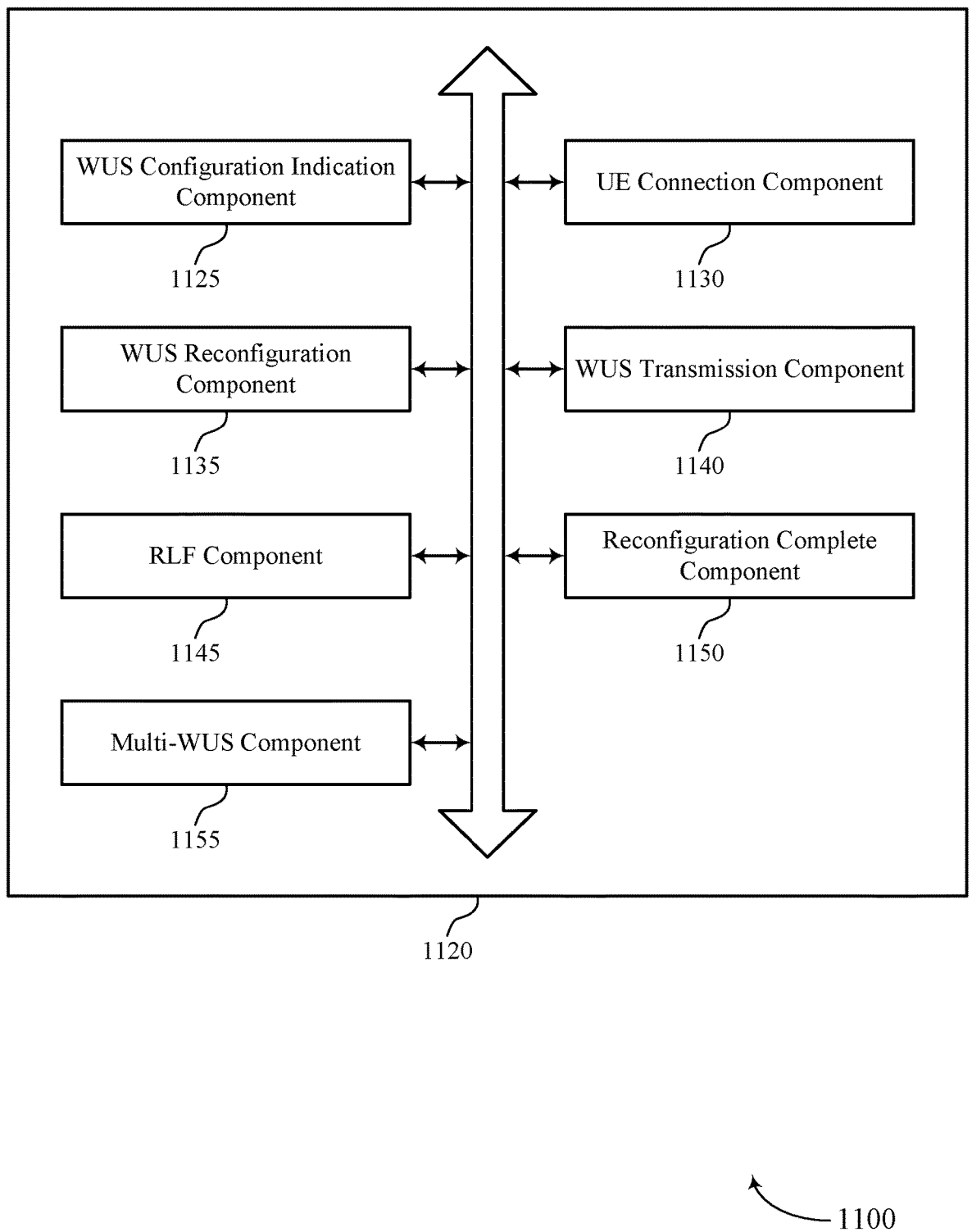
FIG. 11 shows a block diagram of a communications manager that supports WUS error handling in accordance with aspects of the present disclosure.

FIG. 11 shows a block diagram 1100 of a communications manager 1120 that supports WUS error handling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of WUS error handling as described herein. For example, the communications manager 1120 may include a WUS configuration indication component 1125, a UE connection component 1130, a WUS reconfiguration component 1135, a WUS transmission component 1140, an RLF component 1145, a reconfiguration complete component 1150, a multi-WUS component 1155, or any combination thereof. Each of these components may communicate, directly or indirectly, with one another (e.g., via one or more buses).

The communications manager 1120 may support wireless communications at a base station in accordance with examples as disclosed herein. The WUS configuration indication component 1125 may be configured as or otherwise support a means for transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read. The UE connection component 1130 may be configured as or otherwise support a means for determining that at least one UE of the set of multiple UEs is no longer connected to the base station and that a subset of the set of multiple UEs different than the at least one UE are connected to the base station. The WUS reconfiguration component 1135 may be configured as or otherwise support a means for transmitting, to the subset of the set of multiple UEs, a reconfiguration message for receiving the WUS transmission based on determining that the at least one UE is no longer connected to the base station. The WUS transmission component 1140 may be configured as or otherwise support a means for transmitting, to the subset of the set of multiple UEs, a WUS based on the reconfiguration message.

In some examples, the RLF component 1145 may be configured as or otherwise support a means for receiving, from a UE of the subset of the set of multiple UEs, an RLF indication to release a connection with the UE based on a number of error patterns occurring for the UE when receiving the WUS. In some examples, the RLF component 1145 may be configured as or otherwise support a means for attempting to reestablish the connection with the UE based on receiving the RLF. In some examples, the RLF indication may be received based on the number of error patterns satisfying a threshold value.

In some examples, the reconfiguration complete component 1150 may be configured as or otherwise support a means for receiving, from each UE of the subset of the set of multiple UEs, a reconfiguration complete message indicating successful reception of the reconfiguration message, where the WUS is transmitted according to the reconfiguration message based on receiving the reconfiguration complete message from each UE of the subset of the set of multiple UEs.

In some examples, the multi-WUS component 1155 may be configured as or otherwise support a means for transmitting, to the subset of the set of multiple UEs, a first WUS according to the configuration for the WUS transmission, where a first CRC of the first WUS is scrambled with a first PS-RNTI included in the configuration for the WUS transmission. In some examples, the multi-WUS component 1155 may be configured as or otherwise support a means for transmitting, to the subset of the set of multiple UEs, a second WUS according to a reconfiguration in the reconfiguration message for the WUS transmission, where a second CRC is scrambled with a second PS-RNTI included in the reconfiguration message for the WUS transmission.

In some examples, the multi-WUS component 1155 may be configured as or otherwise support a means for receiving, from each UE of the subset of the set of multiple UEs, a reconfiguration complete message indicating successful reception of the reconfiguration message. In some examples, the multi-WUS component 1155 may be configured as or otherwise support a means for refraining from transmitting a subsequent WUS according to the configuration for the WUS transmission based on receiving the reconfiguration complete message from each UE of the subset of the set of multiple UEs.

Figure 12:
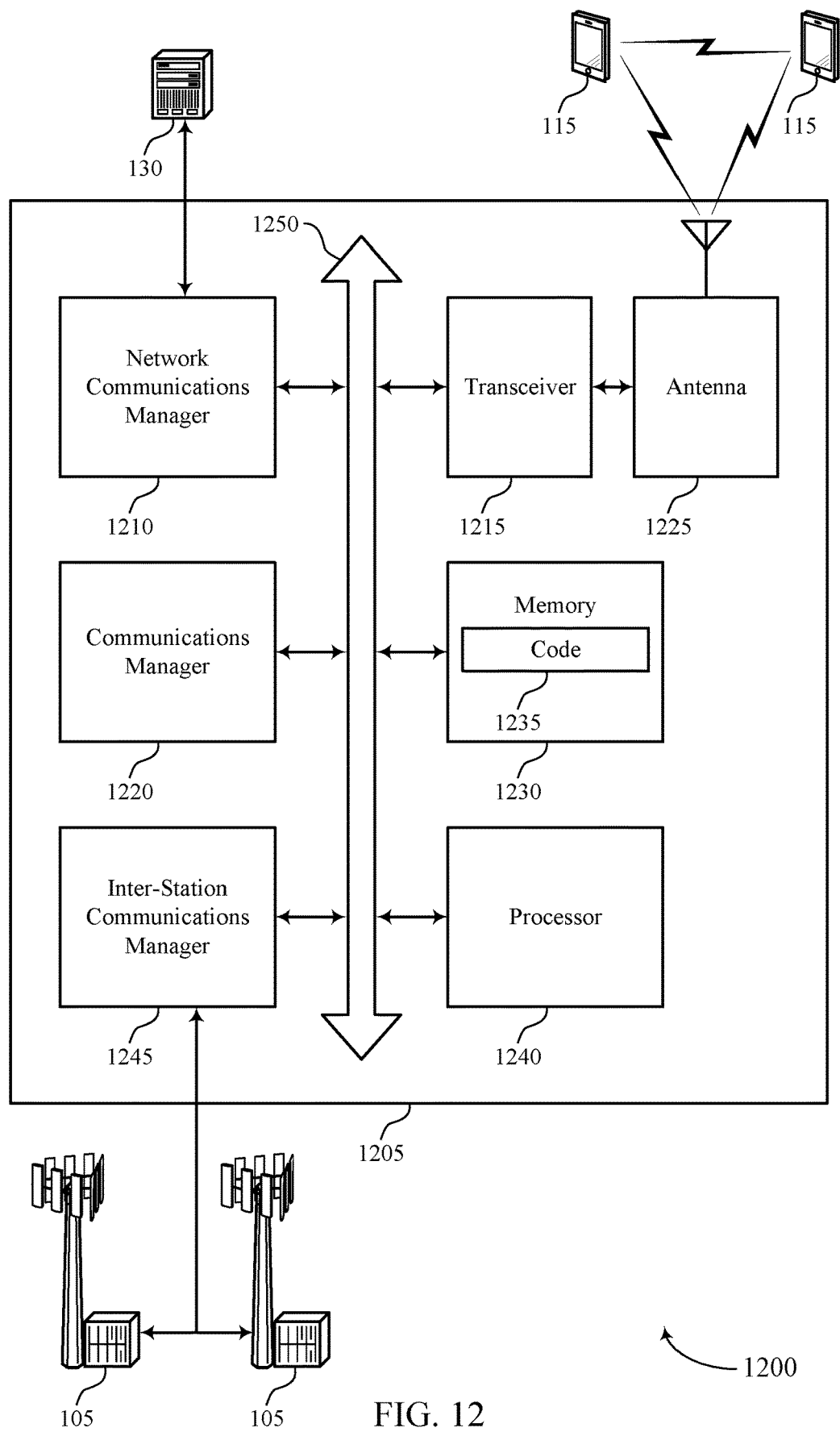
FIG. 12 shows a diagram of a system including a device that supports WUS error handling in accordance with aspects of the present disclosure.

FIG. 12 shows a diagram of a system 1200 including a device 1205 that supports WUS error handling in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting WUS error handling). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read. The communications manager 1220 may be configured as or otherwise support a means for determining that at least one UE of the set of multiple UEs is no longer connected to the base station and that a subset of the set of multiple UEs different than the at least one UE are connected to the base station. The communications manager 1220 may be configured as or otherwise support a means for transmitting, to the subset of the set of multiple UEs, a reconfiguration message for receiving the WUS transmission based on determining that the at least one UE is no longer connected to the base station. The communications manager 1220 may be configured as or otherwise support a means for transmitting, to the subset of the set of multiple UEs, a WUS based on the reconfiguration message.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of WUS error handling as described herein, or the processor 1240 and the memory 1230 may be otherwise configured to perform or support such operations.

Figure 13:
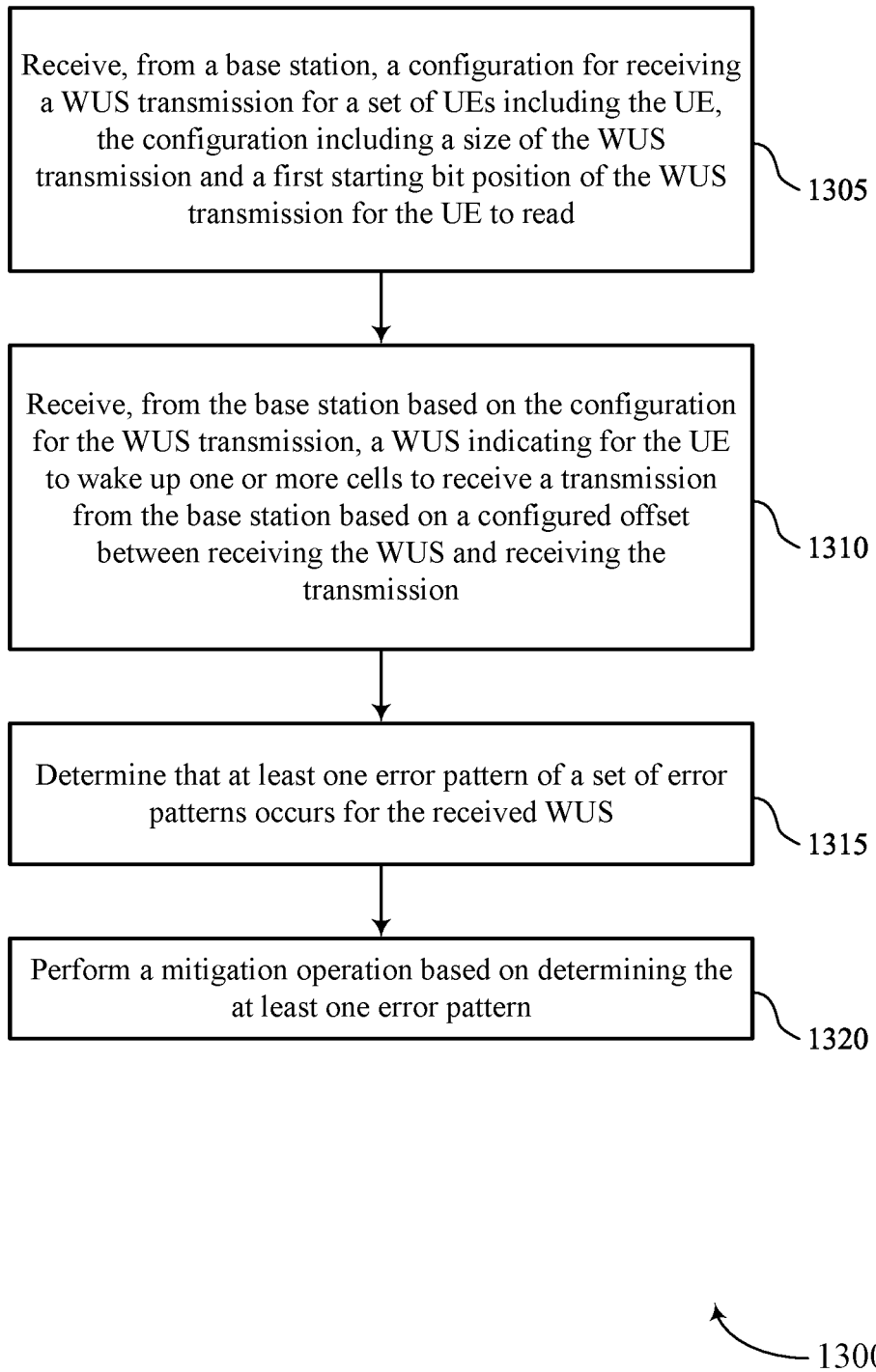
FIGS. 13 through 18 show flowcharts illustrating methods that support WUS error handling in accordance with aspects of the present disclosure.

FIG. 13 shows a flowchart illustrating a method 1300 that supports WUS error handling in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a configuration for receiving a WUS transmission for a set of multiple UEs including the UE, the configuration including a size of the WUS transmission and a first starting bit position of the WUS transmission for the UE to read. The operations of 1305 may be performed in accordance with examples as disclosed herein. In some examples, aspects of the operations of 1305 may be performed by a WUS configuration component 725 as described with reference to FIG. 7.

At 1310, the method may include receiving, from the base station based on the configuration for the WUS transmission, a WUS indicating for the UE to wake up one or more cells to receive a transmission from the base station based on a configured offset between receiving the WUS and receiving the transmission. The operations of 1310 may be performed in accordance with examples as disclosed herein. In some examples, aspects of the operations of 1310 may be performed by a WUS reception component 730 as described with reference to FIG. 7.

At 1315, the method may include determining that at least one error pattern of a set of multiple error patterns occurs for the received WUS. The operations of 1315 may be performed in accordance with examples as disclosed herein. In some examples, aspects of the operations of 1315 may be performed by an error patter determination component 735 as described with reference to FIG. 7.

At 1320, the method may include performing a mitigation operation based on determining the at least one error pattern. The operations of 1320 may be performed in accordance with examples as disclosed herein. In some examples, aspects of the operations of 1320 may be performed by an error pattern mitigation component 740 as described with reference to FIG. 7.

Figure 14:
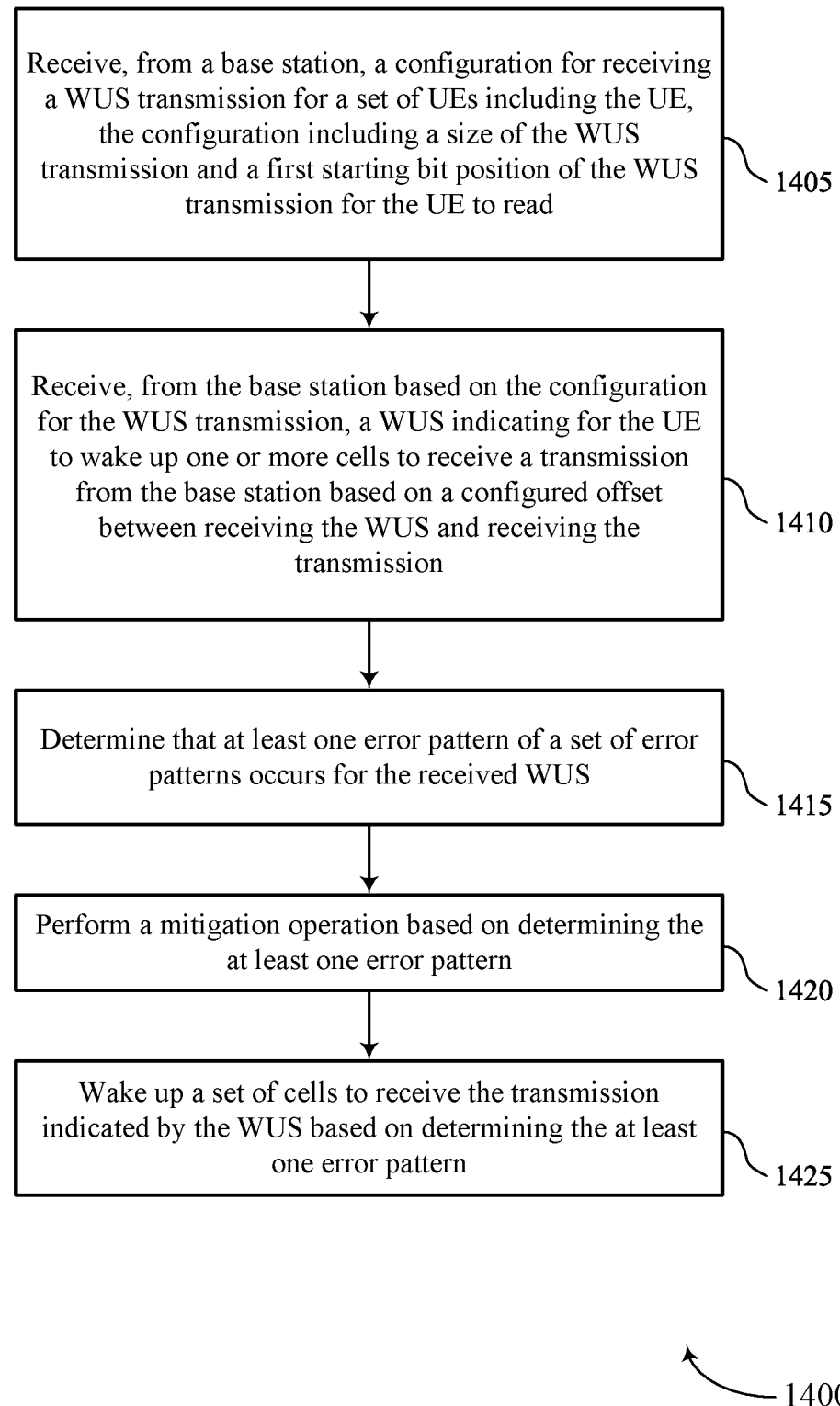

FIG. 14 shows a flowchart illustrating a method 1400 that supports WUS error handling in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a configuration for receiving a WUS transmission for a set of multiple UEs including the UE, the configuration including a size of the WUS transmission and a first starting bit position of the WUS transmission for the UE to read. The operations of 1405 may be performed in accordance with examples as disclosed herein. In some examples, aspects of the operations of 1405 may be performed by a WUS configuration component 725 as described with reference to FIG. 7.

At 1410, the method may include receiving, from the base station based on the configuration for the WUS transmission, a WUS indicating for the UE to wake up one or more cells to receive a transmission from the base station based on a configured offset between receiving the WUS and receiving the transmission. The operations of 1410 may be performed in accordance with examples as disclosed herein. In some examples, aspects of the operations of 1410 may be performed by a WUS reception component 730 as described with reference to FIG. 7.

At 1415, the method may include determining that at least one error pattern of a set of multiple error patterns occurs for the received WUS. The operations of 1415 may be performed in accordance with examples as disclosed herein. In some examples, aspects of the operations of 1415 may be performed by an error patter determination component 735 as described with reference to FIG. 7.

At 1420, the method may include performing a mitigation operation based on determining the at least one error pattern. The operations of 1420 may be performed in accordance with examples as disclosed herein. In some examples, aspects of the operations of 1420 may be performed by an error pattern mitigation component 740 as described with reference to FIG. 7.

At 1425, the method may include waking up a set of multiple cells to receive the transmission indicated by the WUS based on determining the at least one error pattern. The operations of 1425 may be performed in accordance with examples as disclosed herein. In some examples, aspects of the operations of 1425 may be performed by a cell wake up component 745 as described with reference to FIG. 7.

Figure 15:
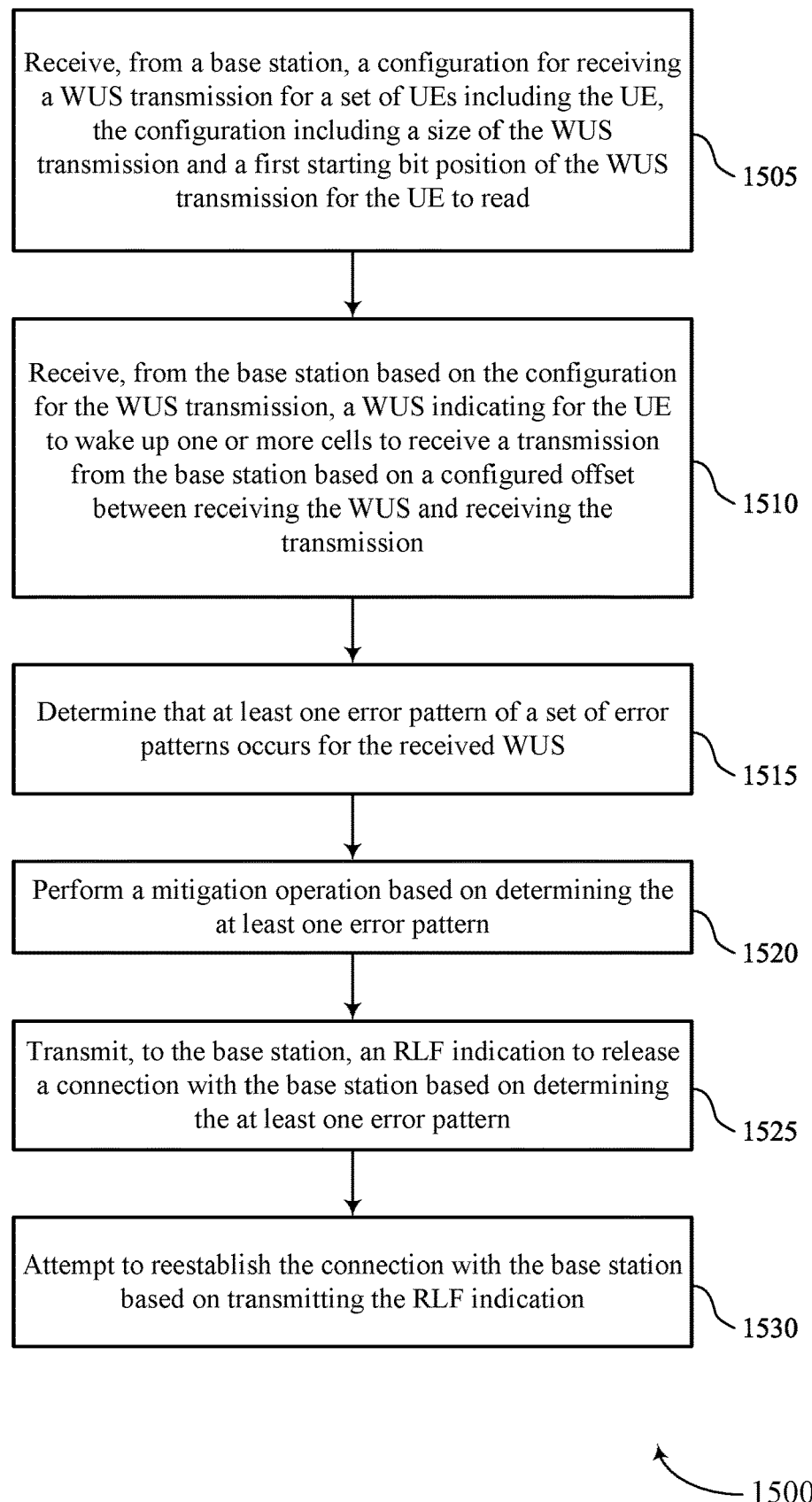

FIG. 15 shows a flowchart illustrating a method 1500 that supports WUS error handling in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a configuration for receiving a WUS transmission for a set of multiple UEs including the UE, the configuration including a size of the WUS transmission and a first starting bit position of the WUS transmission for the UE to read. The operations of 1505 may be performed in accordance with examples as disclosed herein. In some examples, aspects of the operations of 1505 may be performed by a WUS configuration component 725 as described with reference to FIG. 7.

At 1510, the method may include receiving, from the base station based on the configuration for the WUS transmission, a WUS indicating for the UE to wake up one or more cells to receive a transmission from the base station based on a configured offset between receiving the WUS and receiving the transmission. The operations of 1510 may be performed in accordance with examples as disclosed herein. In some examples, aspects of the operations of 1510 may be performed by a WUS reception component 730 as described with reference to FIG. 7.

At 1515, the method may include determining that at least one error pattern of a set of multiple error patterns occurs for the received WUS. The operations of 1515 may be performed in accordance with examples as disclosed herein. In some examples, aspects of the operations of 1515 may be performed by an error patter determination component 735 as described with reference to FIG. 7.

At 1520, the method may include performing a mitigation operation based on determining the at least one error pattern. The operations of 1520 may be performed in accordance with examples as disclosed herein. In some examples, aspects of the operations of 1520 may be performed by an error pattern mitigation component 740 as described with reference to FIG. 7.

At 1525, the method may include transmitting, to the base station, an RLF indication to release a connection with the base station based on determining the at least one error pattern. The operations of 1525 may be performed in accordance with examples as disclosed herein. In some examples, aspects of the operations of 1525 may be performed by an RLF component 750 as described with reference to FIG. 7.

At 1530, the method may include attempting to reestablish the connection with the base station based on transmitting the RLF indication. The operations of 1530 may be performed in accordance with examples as disclosed herein. In some examples, aspects of the operations of 1530 may be performed by an RLF component 750 as described with reference to FIG. 7.

Figure 16:
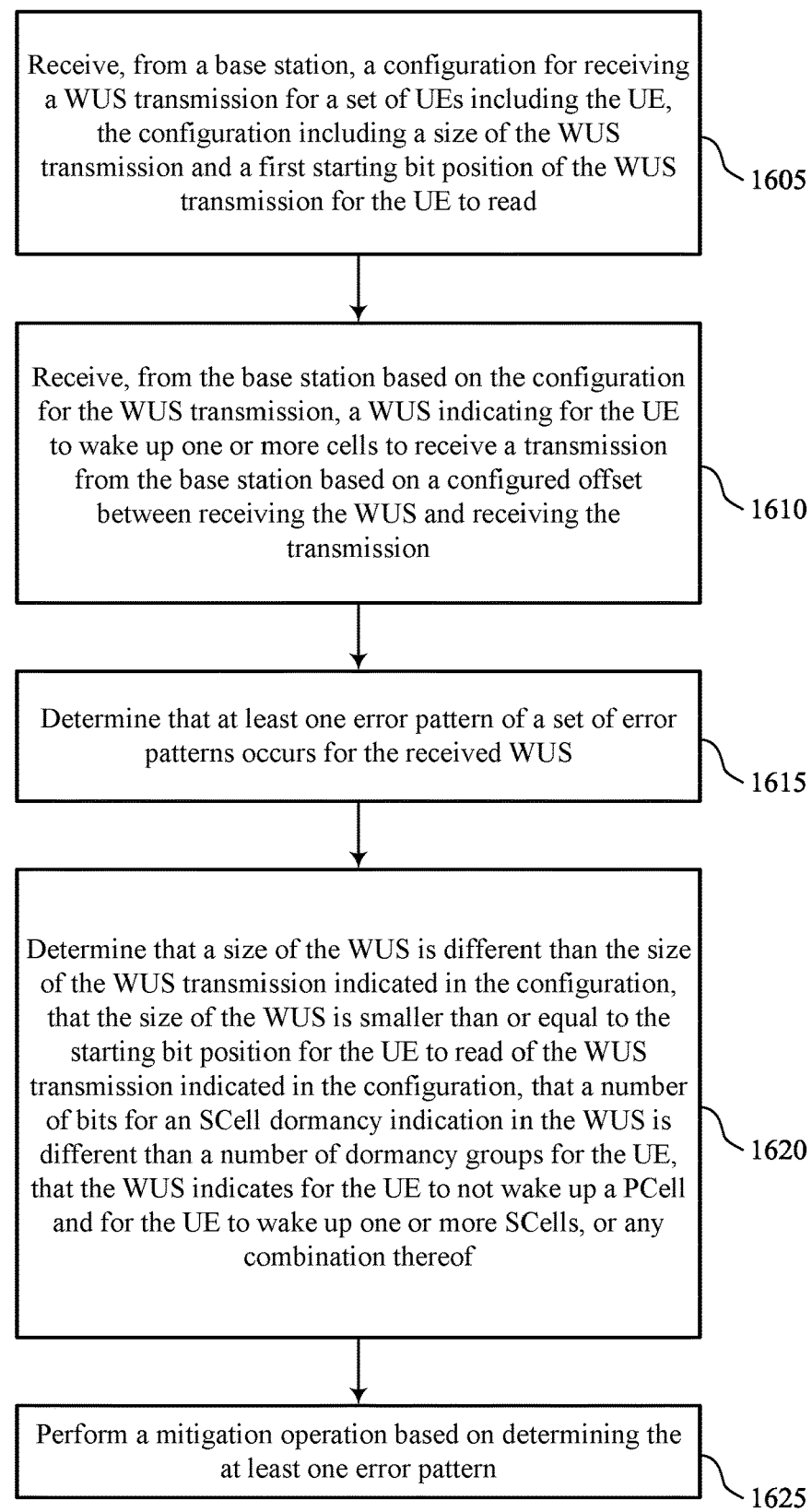

FIG. 16 shows a flowchart illustrating a method 1600 that supports WUS error handling in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a configuration for receiving a WUS transmission for a set of multiple UEs including the UE, the configuration including a size of the WUS transmission and a first starting bit position of the WUS transmission for the UE to read. The operations of 1605 may be performed in accordance with examples as disclosed herein. In some examples, aspects of the operations of 1605 may be performed by a WUS configuration component 725 as described with reference to FIG. 7.

At 1610, the method may include receiving, from the base station based on the configuration for the WUS transmission, a WUS indicating for the UE to wake up one or more cells to receive a transmission from the base station based on a configured offset between receiving the WUS and receiving the transmission. The operations of 1610 may be performed in accordance with examples as disclosed herein. In some examples, aspects of the operations of 1610 may be performed by a WUS reception component 730 as described with reference to FIG. 7.

At 1615, the method may include determining that at least one error pattern of a set of multiple error patterns occurs for the received WUS. The operations of 1615 may be performed in accordance with examples as disclosed herein. In some examples, aspects of the operations of 1615 may be performed by an error patter determination component 735 as described with reference to FIG. 7.

At 1620, the method may include determining that a size of the WUS is different than the size of the WUS transmission indicated in the configuration, that the size of the WUS is smaller than or equal to the starting bit position for the UE to read of the WUS transmission indicated in the configuration, that a number of bits for an SCell dormancy indication in the WUS is different than a number of dormancy groups for the UE, that the WUS indicates for the UE to not wake up a PCell and for the UE to wake up one or more SCells, or any combination thereof. The operations of 1620 may be performed in accordance with examples as disclosed herein. In some examples, aspects of the operations of 1620 may be performed by an error patter determination component 735 as described with reference to FIG. 7.

At 1625, the method may include performing a mitigation operation based on determining the at least one error pattern. The operations of 1625 may be performed in accordance with examples as disclosed herein. In some examples, aspects of the operations of 1625 may be performed by an error pattern mitigation component 740 as described with reference to FIG. 7.

Figure 17:
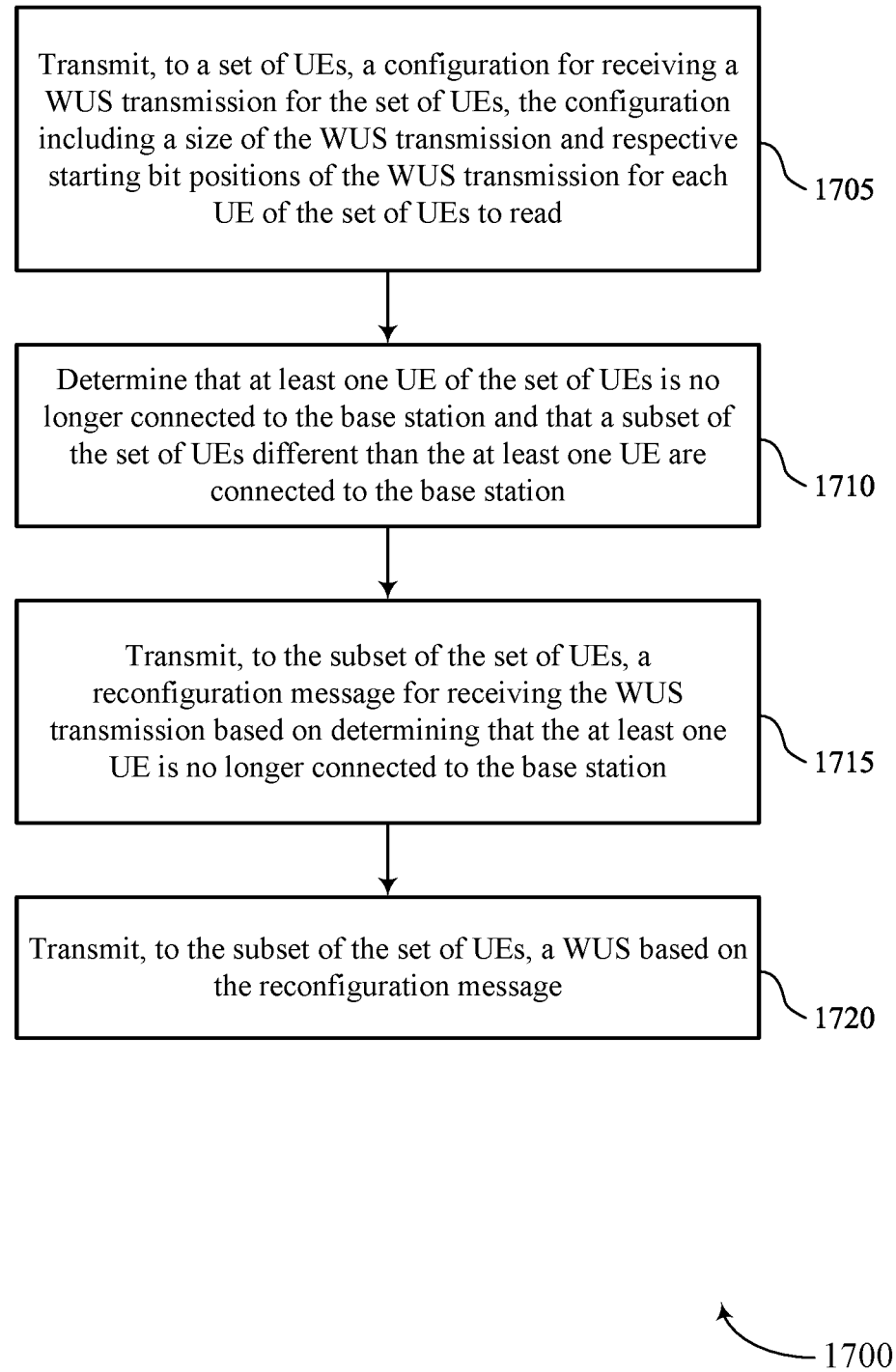

FIG. 17 shows a flowchart illustrating a method 1700 that supports WUS error handling in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read. The operations of 1705 may be performed in accordance with examples as disclosed herein. In some examples, aspects of the operations of 1705 may be performed by a WUS configuration indication component 1125 as described with reference to FIG. 11.

At 1710, the method may include determining that at least one UE of the set of multiple UEs is no longer connected to the base station and that a subset of the set of multiple UEs different than the at least one UE are connected to the base station. The operations of 1710 may be performed in accordance with examples as disclosed herein. In some examples, aspects of the operations of 1710 may be performed by a UE connection component 1130 as described with reference to FIG. 11.

At 1715, the method may include transmitting, to the subset of the set of multiple UEs, a reconfiguration message for receiving the WUS transmission based on determining that the at least one UE is no longer connected to the base station. The operations of 1715 may be performed in accordance with examples as disclosed herein. In some examples, aspects of the operations of 1715 may be performed by a WUS reconfiguration component 1135 as described with reference to FIG. 11.

At 1720, the method may include transmitting, to the subset of the set of multiple UEs, a WUS based on the reconfiguration message. The operations of 1720 may be performed in accordance with examples as disclosed herein. In some examples, aspects of the operations of 1720 may be performed by a WUS transmission component 1140 as described with reference to FIG. 11.

Figure 18:
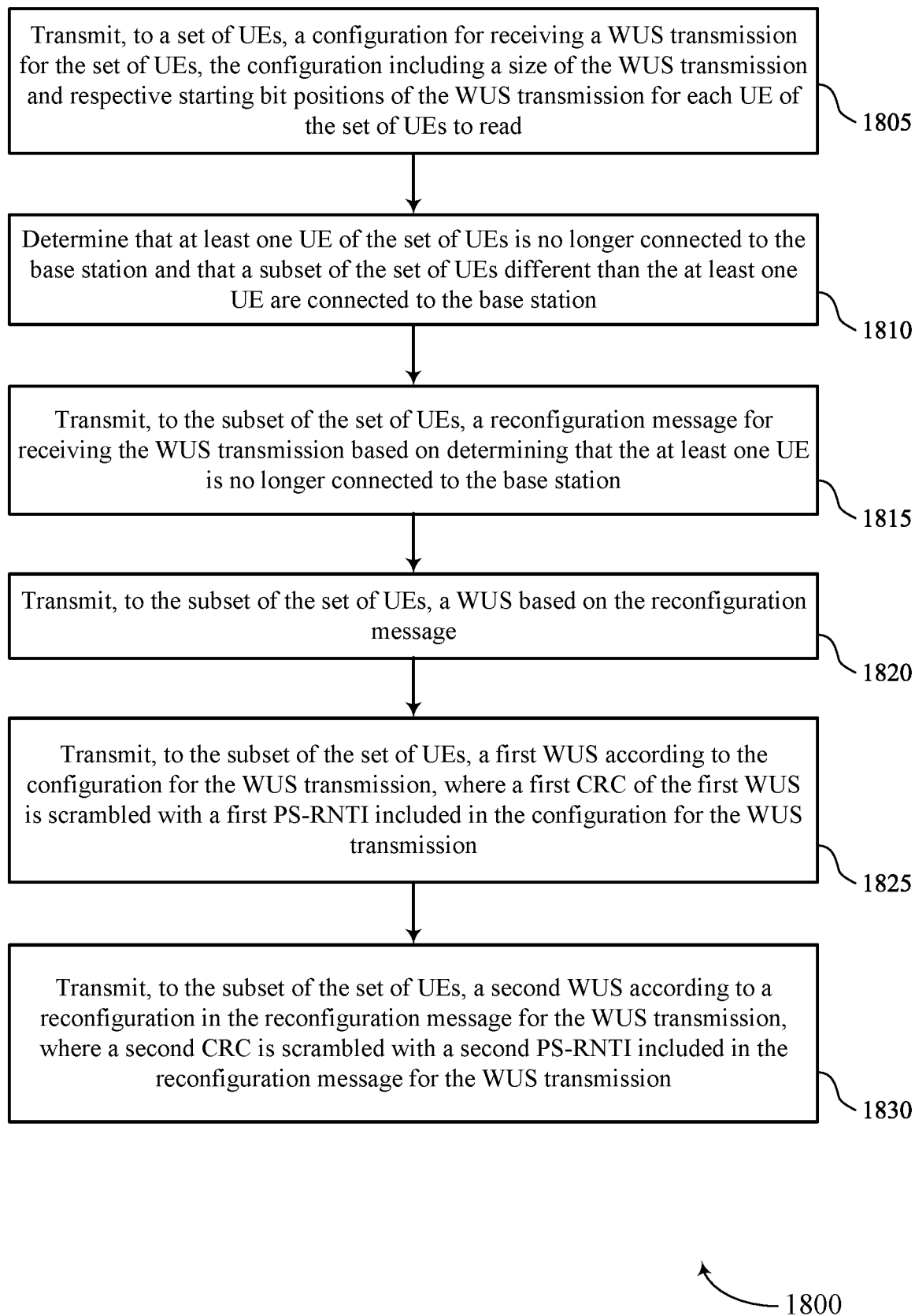

FIG. 18 shows a flowchart illustrating a method 1800 that supports WUS error handling in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a set of multiple UEs, a configuration for receiving a WUS transmission for the set of multiple UEs, the configuration including a size of the WUS transmission and respective starting bit positions of the WUS transmission for each UE of the set of multiple UEs to read. The operations of 1805 may be performed in accordance with examples as disclosed herein. In some examples, aspects of the operations of 1805 may be performed by a WUS configuration indication component 1125 as described with reference to FIG. 11.

At 1810, the method may include determining that at least one UE of the set of multiple UEs is no longer connected to the base station and that a subset of the set of multiple UEs different than the at least one UE are connected to the base station. The operations of 1810 may be performed in accordance with examples as disclosed herein. In some examples, aspects of the operations of 1810 may be performed by a UE connection component 1130 as described with reference to FIG. 11.

At 1815, the method may include transmitting, to the subset of the set of multiple UEs, a reconfiguration message for receiving the WUS transmission based on determining that the at least one UE is no longer connected to the base station. The operations of 1815 may be performed in accordance with examples as disclosed herein. In some examples, aspects of the operations of 1815 may be performed by a WUS reconfiguration component 1135 as described with reference to FIG. 11.

At 1820, the method may include transmitting, to the subset of the set of multiple UEs, a WUS based on the reconfiguration message. The operations of 1820 may be performed in accordance with examples as disclosed herein. In some examples, aspects of the operations of 1820 may be performed by a WUS transmission component 1140 as described with reference to FIG. 11.

At 1825, the method may include transmitting, to the subset of the set of multiple UEs, a first WUS according to the configuration for the WUS transmission, where a first CRC of the first WUS is scrambled with a first PS-RNTI included in the configuration for the WUS transmission. The operations of 1825 may be performed in accordance with examples as disclosed herein. In some examples, aspects of the operations of 1825 may be performed by a multi-WUS component 1155 as described with reference to FIG. 11.

At 1830, the method may include transmitting, to the subset of the set of multiple UEs, a second WUS according to a reconfiguration in the reconfiguration message for the WUS transmission, where a second CRC is scrambled with a second PS-RNTI included in the reconfiguration message for the WUS transmission. The operations of 1830 may be performed in accordance with examples as disclosed herein. In some examples, aspects of the operations of 1830 may be performed by a multi-WUS component 1155 as described with reference to FIG. 11.

The following provides an overview of aspects of the present disclosure:

Aspect 1: A method for wireless communications at a UE, comprising: receiving, from a base station, a configuration for receiving a wake-up signal transmission for a plurality of UEs comprising the UE, the configuration comprising a size of the wake-up signal transmission and a first starting bit position of the wake-up signal transmission for the UE to read; receiving, from the base station based at least in part on the configuration for the wake-up signal transmission, a wake-up signal indicating for the UE to wake up one or more cells to receive a transmission from the base station based at least in part on a configured offset between receiving the wake-up signal and receiving the transmission; determining that at least one error pattern of a plurality of error patterns occurs for the received wake-up signal; and performing a mitigation operation based at least in part on determining the at least one error pattern.

Aspect 2: The method of aspect 1, wherein performing the mitigation operation comprises: waking up a plurality of cells to receive the transmission indicated by the wake-up signal based at least in part on determining the at least one error pattern.

Aspect 3: The method of aspect 2, wherein the plurality of cells comprises a primary cell of a master cell group, one or more secondary cells of the master cell group, a primary secondary cell of a secondary cell group, one or more secondary cells of the secondary cell group, or any combination thereof.

Aspect 4: The method of aspect 1, wherein performing the mitigation operation comprises: transmitting, to the base station, a radio link failure indication for releasing a connection with the base station based at least in part on determining the at least one error pattern; and attempting to reestablish the connection with the base station based at least in part on transmitting the radio link failure.

Aspect 5: The method of aspect 4, further comprising: determining to transmit the radio link failure indication based at least in part on determining that a number of error patterns for receiving the wake-up signal transmission according to the configuration occur, wherein the number of error patterns satisfies a threshold value.

Aspect 6: The method of any of aspects 1 through 5, further comprising: receiving, from the base station, a reconfiguration message for the wake-up signal transmission, the reconfiguration message comprising a second size of the wake-up signal transmission different than the size of the wake-up signal transmission, comprising a second starting bit position for the UE to read of the wake-up signal transmission different than the first starting bit position, or both; and receiving, from the base station, a second wake-up signal based at least in part on the reconfiguration message.

Aspect 7: The method of aspect 6, further comprising: transmitting, to the base station, a reconfiguration complete message indicating successful reception of the reconfiguration message, wherein the second wake-up signal is received based at least in part on transmitting the reconfiguration complete message.

Aspect 8: The method of any of aspects 1 through 7, wherein the configuration for the wake-up signal transmission further comprises an indication of a first power saving radio network temporary identifier with which a cyclic redundancy check of the wake-up signal is scrambled, the method further comprising: receiving the wake-up signal based at least in part on the cyclic redundancy check of the wake-up signal being scrambled with the first power saving radio network temporary identifier; and receiving, from the base station, a second wake-up signal with a cyclic redundancy check scrambled with a second power saving radio network temporary identifier, the second wake-up signal indicating for the UE to wake up one or more additional cells to receive the transmission from the base station.

Aspect 9: The method of aspect 8, further comprising: waking up the one or more cells indicated by the wake-up signal based at least in part on the configuration for the wake-up signal transmission comprising the indication of the first power saving radio network temporary identifier.

Aspect 10: The method of any of aspects 8 through 9, further comprising: receiving, from the base station, a reconfiguration message for the wake-up signal transmission, the reconfiguration message comprising an indication of the second power saving radio network temporary identifier; and waking up the one or more additional cells indicated by the second wake-up signal based at least in part on receiving the reconfiguration message comprising the indication of the second power saving radio network temporary identifier.

Aspect 11: The method of any of aspects 1 through 10, wherein determining the error pattern of the plurality of error patterns comprises: determining that a size of the wake-up signal is different than the size of the wake-up signal transmission indicated in the configuration, that the size of the wake-up signal is smaller than or equal to the starting bit position for the UE to read of the wake-up signal transmission indicated in the configuration, that a number of bits for a secondary cell dormancy indication in the wake-up signal is different than a number of dormancy groups for the UE, that the wake-up signal indicates for the UE to not wake up a primary cell and for the UE to wake up one or more secondary cells, or any combination thereof.

Aspect 12: A method for wireless communications at a base station, comprising: transmitting, to a plurality of user equipment (UEs), a configuration for receiving a wake-up signal transmission for the plurality of UEs, the configuration comprising a size of the wake-up signal transmission and respective starting bit positions of the wake-up signal transmission for each UE of the plurality of UEs to read; determining that at least one UE of the plurality of UEs is no longer connected to the base station and that a subset of the plurality of UEs different than the at least one UE are connected to the base station; transmitting, to the subset of the plurality of UEs, a reconfiguration message for receiving the wake-up signal transmission based at least in part on determining that the at least one UE is no longer connected to the base station; and transmitting, to the subset of the plurality of UEs, a wake-up signal based at least in part on the reconfiguration message.

Aspect 13: The method of aspect 12, further comprising: receiving, from a UE of the subset of the plurality of UEs, a radio link failure indication to release a connection with the UE based at least in part on a number of error patterns occurring for the UE when receiving the wake-up signal; and attempting to reestablish the connection with the UE based at least in part on receiving the radio link failure.

Aspect 14: The method of aspect 13, wherein the radio link failure indication is received based at least in part on the number of error patterns satisfying a threshold value.

Aspect 15: The method of any of aspects 12 through 14, further comprising: receiving, from each UE of the subset of the plurality of UEs, a reconfiguration complete message indicating successful reception of the reconfiguration message, wherein the wake-up signal is transmitted according to the reconfiguration message based at least in part on receiving the reconfiguration complete message from each UE of the subset of the plurality of UEs.

Aspect 16: The method of any of aspects 12 through 15, further comprising: transmitting, to the subset of the plurality of UEs, a first wake-up signal according to the configuration for the wake-up signal transmission, wherein a first cyclic redundancy check of the first wake-up signal is scrambled with a first power saving radio network temporary identifier included in the configuration for the wake-up signal transmission; and transmitting, to the subset of the plurality of UEs, a second wake-up signal according to a reconfiguration in the reconfiguration message for the wake-up signal transmission, wherein a second cyclic redundancy check is scrambled with a second power saving radio network temporary identifier included in the reconfiguration message for the wake-up signal transmission.

Aspect 17: The method of aspect 16, further comprising: receiving, from each UE of the subset of the plurality of UEs, a reconfiguration complete message indicating successful reception of the reconfiguration message; and refraining from transmitting a subsequent wake-up signal according to the configuration for the wake-up signal transmission based at least in part on receiving the reconfiguration complete message from each UE of the subset of the plurality of UEs.

Aspect 18: An apparatus for wireless communications at a UE, comprising a processor; memory coupled with the processor; and instructions stored in the memory and executable by the processor to cause the apparatus to perform a method of any of aspects 1 through 11.

Aspect 19: An apparatus for wireless communications at a UE, comprising at least one means for performing a method of any of aspects 1 through 11.

Aspect 20: A non-transitory computer-readable medium storing code for wireless communications at a UE, the code comprising instructions executable by a processor to perform a method of any of aspects 1 through 11.

Aspect 21: An apparatus for wireless communications at a base station, comprising a processor; memory coupled with the processor; and instructions stored in the memory and executable by the processor to cause the apparatus to perform a method of any of aspects 12 through 17.

Aspect 22: An apparatus for wireless communications at a base station, comprising at least one means for performing a method of any of aspects 12 through 17.

Aspect 23: A non-transitory computer-readable medium storing code for wireless communications at a base station, the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a configuration for receiving a wake-up signal transmission for a plurality of UEs comprising the UE, the configuration comprising a size of the wake-up signal transmission and a first starting bit position indicating a portion of the wake-up signal transmission intended for the UE to read;
    receiving, at the UE and based at least in part on the configuration, a wake-up signal indicating for the UE to wake up one or more cells of the UE to receive a transmission from a network device, the wake-up signal further indicating a configured offset between receiving the wake-up signal and receiving the transmission; and
    performing a mitigation operation to wake up the one or more cells of the UE, to release a connection with the network device, or both based at least in part on at least one error pattern of a plurality of error patterns occurring for the wake-up signal.

2. The method of claim 1, wherein performing the mitigation operation comprises:
    waking up a plurality of cells to receive the transmission indicated by the wake-up signal based at least in part on determining the at least one error pattern.

3. The method of claim 2, wherein the plurality of cells comprises a primary cell of a master cell group, one or more secondary cells of the master cell group, a primary secondary cell of a secondary cell group, one or more secondary cells of the secondary cell group, or any combination thereof.

4. The method of claim 1, wherein performing the mitigation operation comprises:
    transmitting, to the network device, a radio link failure indication to release the connection with the network device based at least in part on determining the at least one error pattern; and
    attempting to reestablish the connection with the network device based at least in part on transmitting the radio link failure indication.

5. The method of claim 4, further comprising:
    determining to transmit the radio link failure indication based at least in part on determining that a number of error patterns for receiving the wake-up signal transmission according to the configuration occur, wherein the number of error patterns satisfies a threshold value.

6. The method of claim 1, further comprising:
    receiving, from the network device, a reconfiguration message for the wake-up signal transmission, the reconfiguration message comprising a second size of the wake-up signal transmission different than the size of the wake-up signal transmission, comprising a second starting bit position for the UE to read of the wake-up signal transmission different than the first starting bit position, or both; and
    receiving, from the network device, a second wake-up signal based at least in part on the reconfiguration message.

7. The method of claim 6, further comprising:
transmitting, to the network device, a reconfiguration complete message indicating successful reception of the reconfiguration message, wherein the second wake-up signal is received based at least in part on transmitting the reconfiguration complete message.

8. The method of claim 1, wherein the configuration for the wake-up signal transmission further comprises an indication of a first power saving radio network temporary identifier with which a cyclic redundancy check of the wake-up signal is scrambled, the method further comprising:
receiving the wake-up signal based at least in part on the cyclic redundancy check of the wake-up signal being scrambled with the first power saving radio network temporary identifier; and
receiving, from the network device, a second wake-up signal with a cyclic redundancy check scrambled with a second power saving radio network temporary identifier, the second wake-up signal indicating for the UE to wake up one or more additional cells to receive the transmission from the network device.

9. The method of claim 8, further comprising:
waking up the one or more cells indicated by the wake-up signal based at least in part on the configuration for the wake-up signal transmission comprising the indication of the first power saving radio network temporary identifier.

10. The method of claim 8, further comprising:
receiving, from the network device, a reconfiguration message for the wake-up signal transmission, the reconfiguration message comprising an indication of the second power saving radio network temporary identifier; and
waking up the one or more additional cells indicated by the second wake-up signal based at least in part on receiving the reconfiguration message comprising the indication of the second power saving radio network temporary identifier.

11. The method of claim 1, wherein determining the at least one error pattern of the plurality of error patterns comprises:
determining that a size of the wake-up signal is different than the size of the wake-up signal transmission indicated in the configuration, that the size of the wake-up signal is smaller than or equal to a starting bit position for the UE to read of the wake-up signal transmission indicated in the configuration, that a number of bits for a secondary cell dormancy indication in the wake-up signal is different than a number of dormancy groups for the UE, that the wake-up signal indicates for the UE to not wake up a primary cell and for the UE to wake up one or more secondary cells, or any combination thereof.

12. An apparatus for wireless communications at a user equipment (UE), comprising:
a processor;
memory coupled with the processor; and
instructions stored in the memory and executable by the processor to cause the apparatus to:
receive a configuration for receiving a wake-up signal transmission for a plurality of UEs comprising the UE, the configuration comprising a size of the wake-up signal transmission and a first starting bit position indicating a portion of the wake-up signal transmission intended for the UE to read;
receive, at the UE and based at least in part on the configuration, a wake-up signal indicating for the UE to wake up one or more cells of the UE to receive a transmission from a network device, the wake-up signal further indicating a configured offset between receiving the wake-up signal and receiving the transmission; and
perform a mitigation operation to wake up the one or more cells of the UE, to release a connection with the network device, or both based at least in part on at least one error pattern of a plurality of error patterns occurring for the wake-up signal.

13. The apparatus of claim 12, wherein the instructions to perform the mitigation operation are executable by the processor to cause the apparatus to:
wake up a plurality of cells to receive the transmission indicated by the wake-up signal based at least in part on determining the at least one error pattern.

14. The apparatus of claim 13, wherein the plurality of cells comprises a primary cell of a master cell group, one or more secondary cells of the master cell group, a primary secondary cell of a secondary cell group, one or more secondary cells of the secondary cell group, or any combination thereof.

15. The apparatus of claim 12, wherein the instructions to perform the mitigation operation are executable by the processor to cause the apparatus to:
transmit, to the network device, a radio link failure indication to release the connection with the network device based at least in part on determining the at least one error pattern; and
attempt to reestablish the connection with the network device based at least in part on transmitting the radio link failure indication.

16. The apparatus of claim 15, wherein the instructions are further executable by the processor to cause the apparatus to:
determine to transmit the radio link failure indication based at least in part on determining that a number of error patterns for receiving the wake-up signal transmission according to the configuration occur, wherein the number of error patterns satisfies a threshold value.

17. The apparatus of claim 12, wherein the instructions are further executable by the processor to cause the apparatus to:
receive, from the network device, a reconfiguration message for the wake-up signal transmission, the reconfiguration message comprising a second size of the wake-up signal transmission different than the size of the wake-up signal transmission, comprising a second starting bit position for the UE to read of the wake-up signal transmission different than the first starting bit position, or both; and
receive, from the network device, a second wake-up signal based at least in part on the reconfiguration message.

18. The apparatus of claim 17, wherein the instructions are further executable by the processor to cause the apparatus to:
transmit, to the network device, a reconfiguration complete message indicating successful reception of the reconfiguration message, wherein the second wake-up signal is received based at least in part on transmitting the reconfiguration complete message.

19. The apparatus of claim 12, wherein the configuration for the wake-up signal transmission further comprises an indication of a first power saving radio network temporary identifier with which a cyclic redundancy check of the wake-up signal is scrambled, and the instructions are further executable by the processor to cause the apparatus to:
receive the wake-up signal based at least in part on the cyclic redundancy check of the wake-up signal being scrambled with the first power saving radio network temporary identifier; and
receive, from the network device, a second wake-up signal with a cyclic redundancy check scrambled with a second power saving radio network temporary identifier, the second wake-up signal indicating for the UE to wake up one or more additional cells to receive the transmission from the network device.

20. The apparatus of claim 19, wherein the instructions are further executable by the processor to cause the apparatus to:
wake up the one or more cells indicated by the wake-up signal based at least in part on the configuration for the wake-up signal transmission comprising the indication of the first power saving radio network temporary identifier.

21. The apparatus of claim 19, wherein the instructions are further executable by the processor to cause the apparatus to:
receive, from the network device, a reconfiguration message for the wake-up signal transmission, the reconfiguration message comprising an indication of the second power saving radio network temporary identifier; and
wake up the one or more additional cells indicated by the second wake-up signal based at least in part on receiving the reconfiguration message comprising the indication of the second power saving radio network temporary identifier.

22. The apparatus of claim 12, wherein the instructions to determine the at least one error pattern of the plurality of error patterns are executable by the processor to cause the apparatus to:
determine that a size of the wake-up signal is different than the size of the wake-up signal transmission indicated in the configuration, that the size of the wake-up signal is smaller than or equal to a starting bit position for the UE to read of the wake-up signal transmission indicated in the configuration, that a number of bits for a secondary cell dormancy indication in the wake-up signal is different than a number of dormancy groups for the UE, that the wake-up signal indicates for the UE to not wake up a primary cell and for the UE to wake up one or more secondary cells, or any combination thereof.

23. An apparatus for wireless communications at a user equipment (UE), comprising:
means for receiving a configuration for receiving a wake-up signal transmission for a plurality of UEs comprising the UE, the configuration comprising a size of the wake-up signal transmission and a first starting bit position indicating a portion of the wake-up signal transmission intended for the UE to read;
means for receiving, at the UE and based at least in part on the configuration, a wake-up signal indicating for the UE to wake up one or more cells of the UE to receive a transmission from a network device, the wake-up signal further indicating a configured offset between receiving the wake-up signal and receiving the transmission; and
means for performing a mitigation operation to wake up the one or more cells of the UE, to release a connection with the network device, or both based at least in part on at least one error pattern of a plurality of error patterns occurring for the wake-up signal.

24. A non-transitory computer-readable medium storing code for wireless communications at a user equipment (UE), the code comprising instructions executable by a processor to:
receive a configuration for receiving a wake-up signal transmission for a plurality of UEs comprising the UE, the configuration comprising a size of the wake-up signal transmission and a first starting bit position indicating a portion of the wake-up signal transmission intended for the UE to read;
receive, at the UE and from based at least in part on the configuration, a wake-up signal indicating for the UE to wake up one or more cells of the UE to receive a transmission from a network device, the wake-up signal further indicating a configured offset between receiving the wake-up signal and receiving the transmission; and
perform a mitigation operation to wake up the one or more cells of the UE, to release a connection with the network device, or both based at least in part on at least one error pattern of a plurality of error patterns occurring for the wake-up signal.

* * * * *